United States Patent [19]
Sawada

[11] Patent Number: 6,141,507
[45] Date of Patent: Oct. 31, 2000

[54] SERVICE SYSTEM FOR IMAGE FORMING APPARATUSES

[75] Inventor: Masaithi Sawada, Tokyo, Japan

[73] Assignee: Ricoh Company, Ltd., Tokyo, Japan

[21] Appl. No.: 09/350,098

[22] Filed: Jul. 9, 1999

[30] Foreign Application Priority Data

Jul. 10, 1998 [JP] Japan ................................ 10-196131

[51] Int. Cl.[7] .................................................. G03G 15/00
[52] U.S. Cl. ............................... 399/8; 399/10; 399/16; 399/21; 399/24
[58] Field of Search .................... 399/8–11, 16, 399/18, 21, 24

[56] References Cited

U.S. PATENT DOCUMENTS

| | | | |
|---|---|---|---|
| 5,596,390 | 1/1997 | Sawada | 399/8 |
| 5,694,201 | 12/1997 | Hayashi et al. | |
| 5,715,496 | 2/1998 | Sawada et al. | 399/8 |
| 5,790,916 | 8/1998 | Sawada | 399/21 |
| 5,835,816 | 11/1998 | Sawada et al. | 399/8 |
| 5,887,216 | 3/1999 | Motoyama | 399/8 |
| 5,913,090 | 6/1999 | Sawada et al. | 399/8 |
| 5,995,771 | 11/1999 | Miyawaki | 399/8 |

FOREIGN PATENT DOCUMENTS 0 599 606  6/1994  European Pat. Off. .
0 768 582  4/1997  European Pat. Off. .

Primary Examiner—William J. Royer
Attorney, Agent, or Firm—Oblon, Spivak, McClelland, Maier & Neustadt, P.C.

[57] ABSTRACT

In an image forming apparatus service system, each image forming apparatus adds, when an abnormal or preabnormal phenomenon or similar factor to be reported occurs therein, information relating to its operation and including the cumulative number of images formed to information representative of the above factor. The information and additional information are sent to a central control unit managing the image forming apparatus. Each central control unit collects and stores the information received from image forming apparatuses lying in its coverage apparatus by apparatus and transfers the day's (one day) information stored to a server at a preselected time via a WAN (Wide Area Network). The server stores the information received from all the central control units in a format suitable for a data base. A person using each data processing unit is capable of downloading desired information from each central control unit or the server via the WAN by operating a keyboard or a mouse.

32 Claims, 19 Drawing Sheets

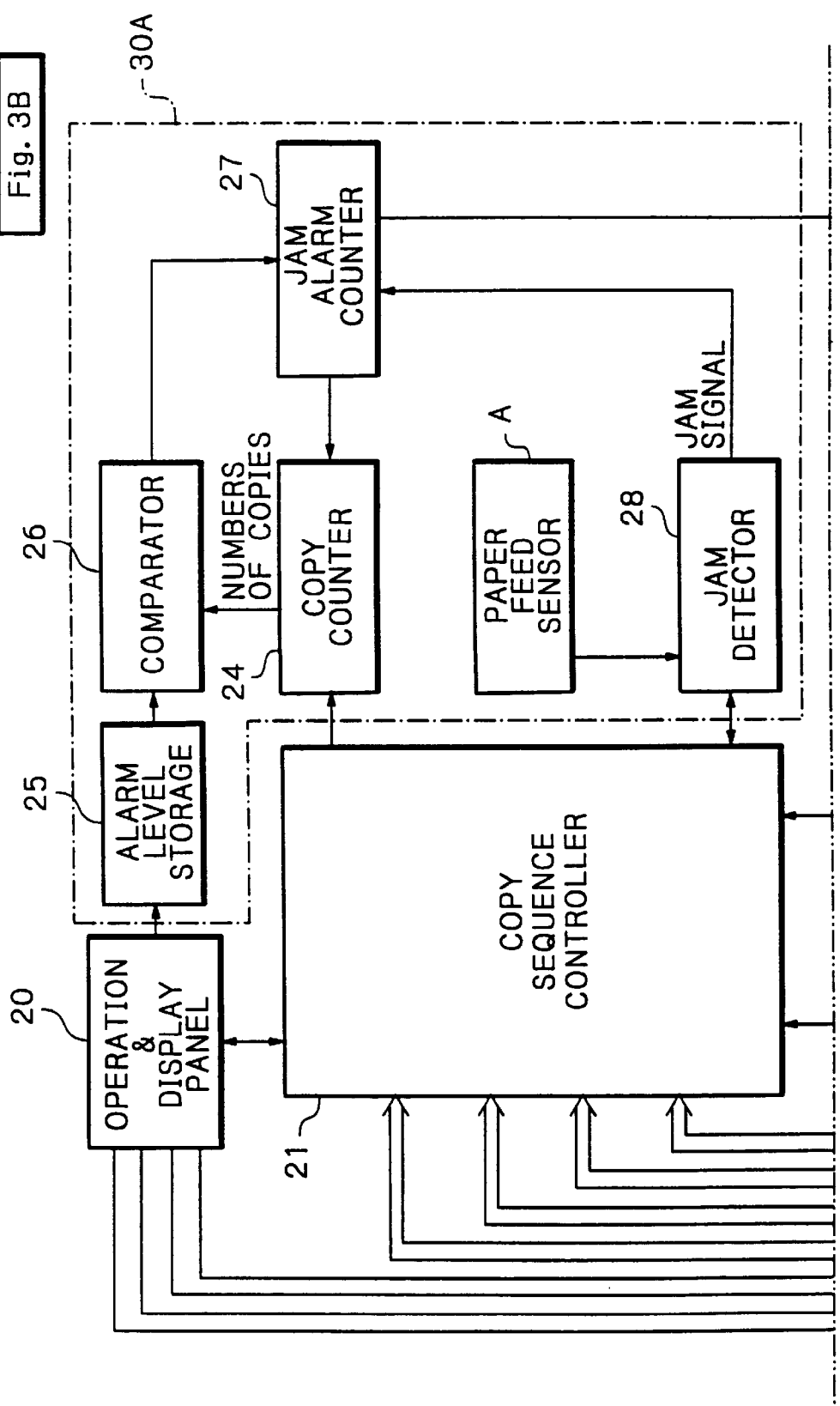

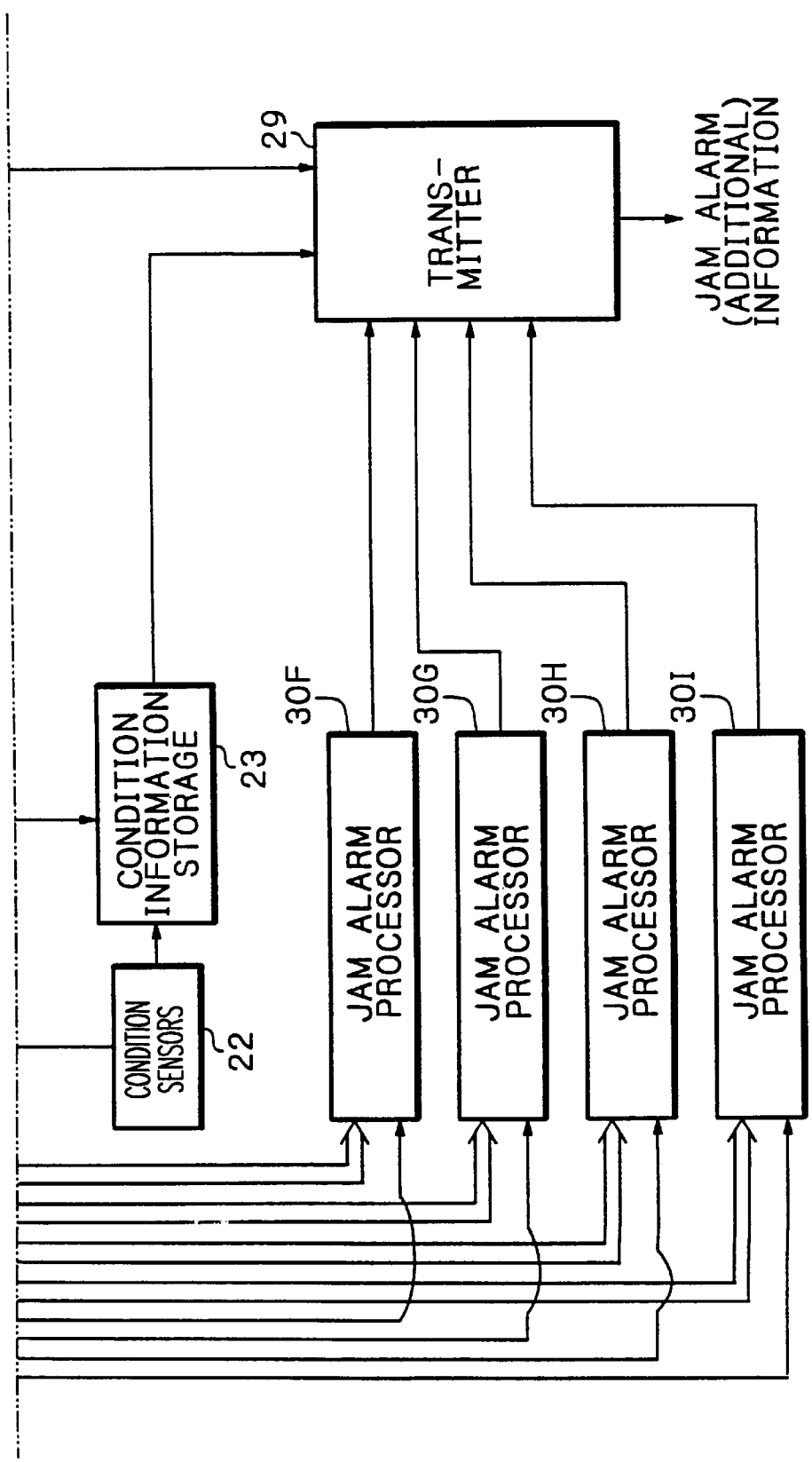

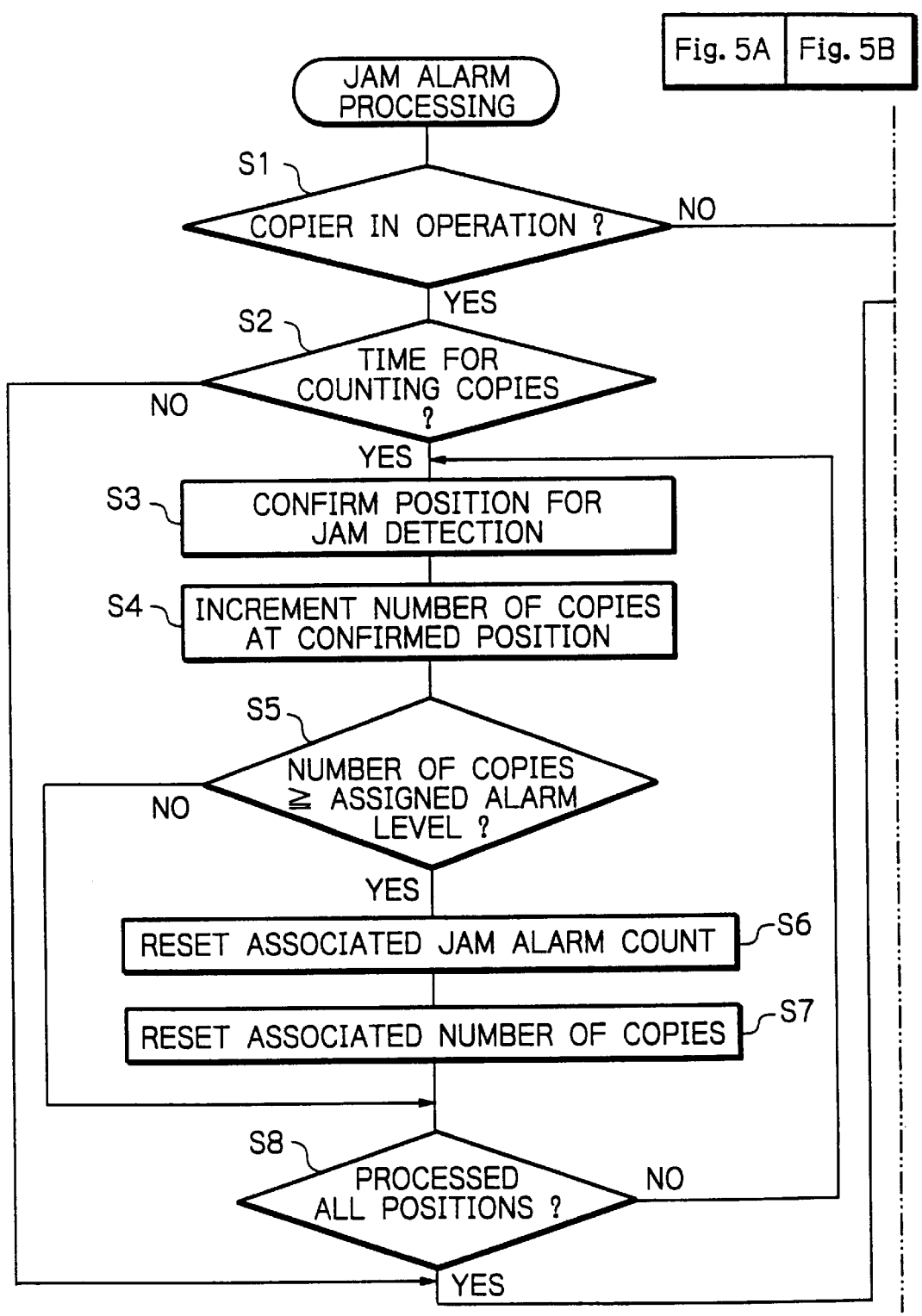

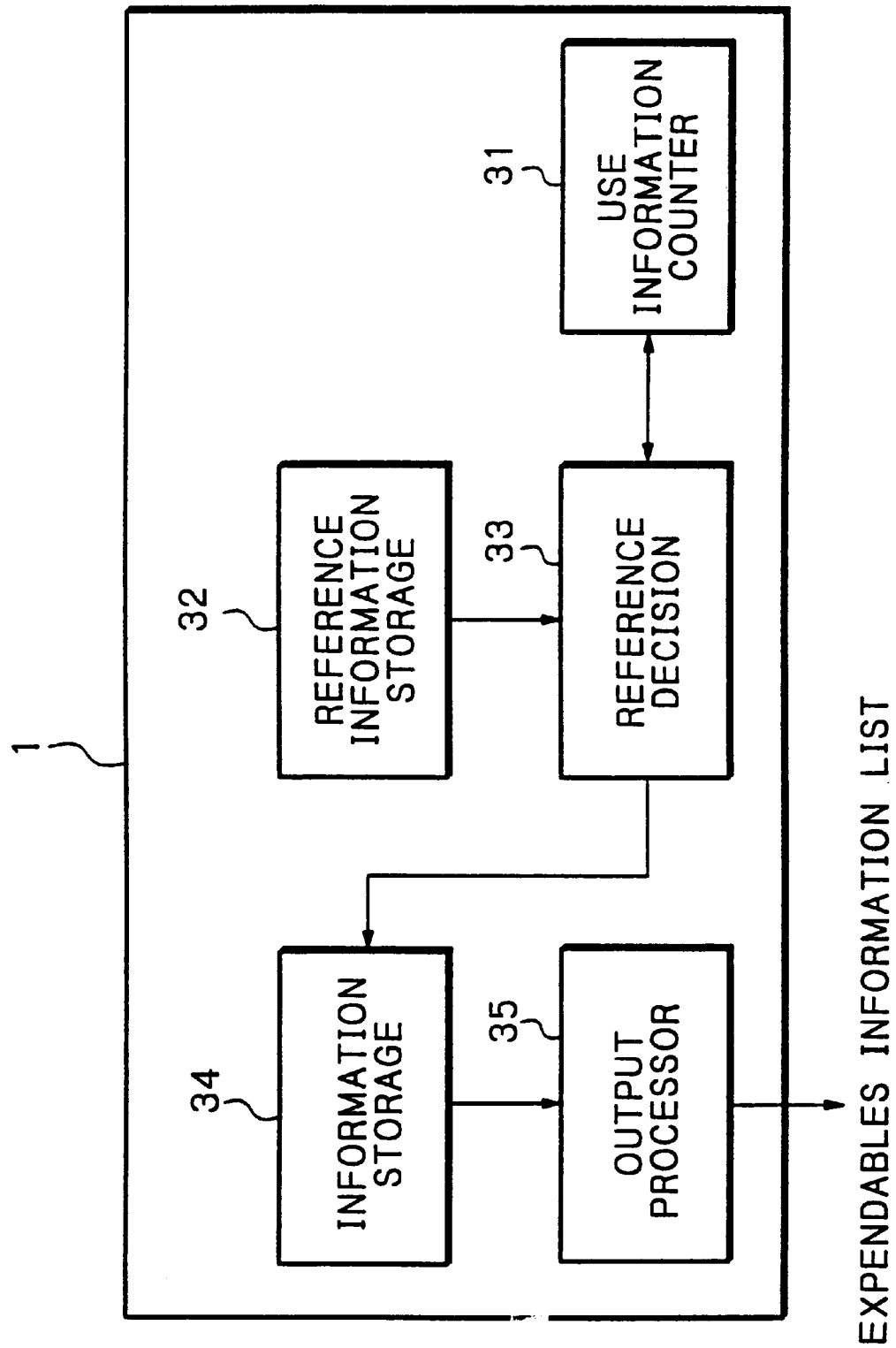

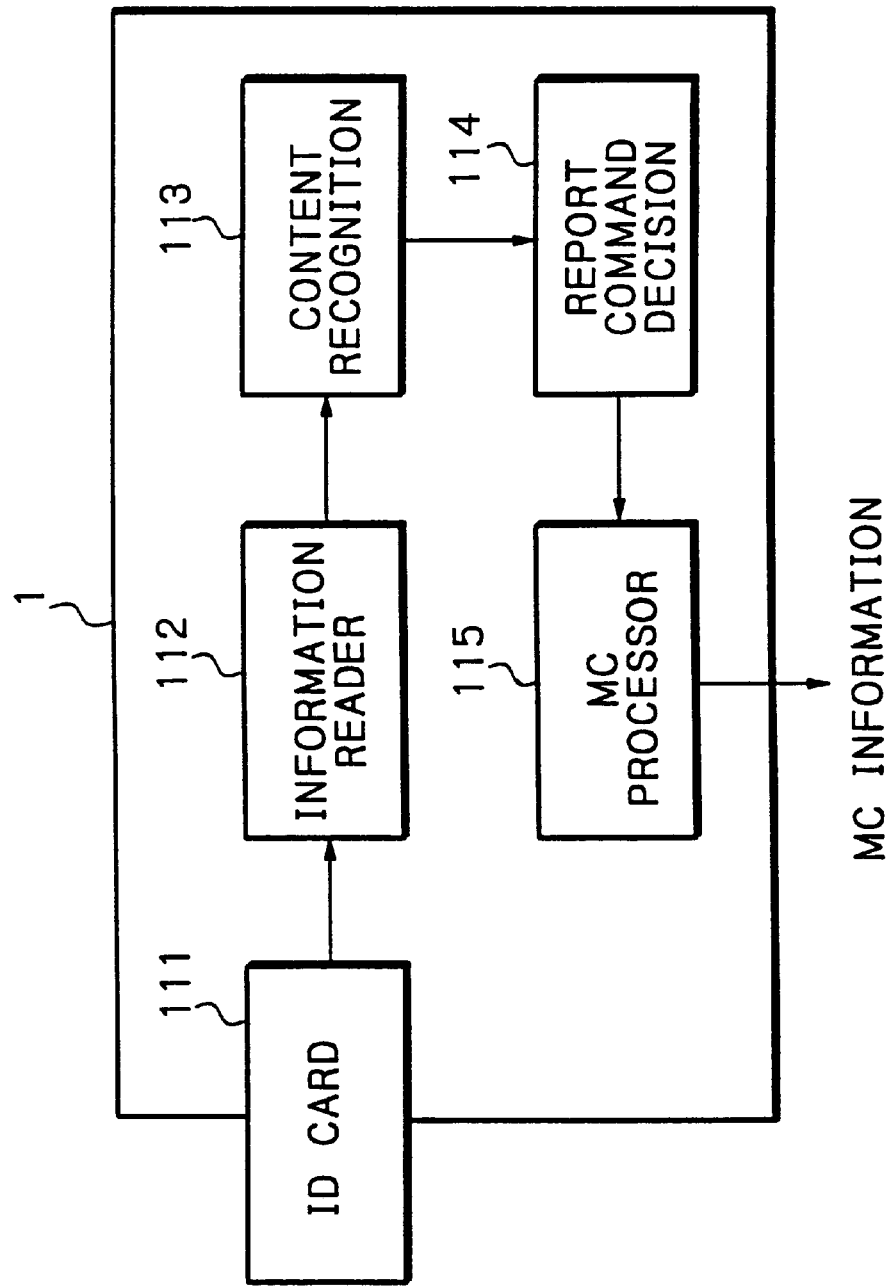

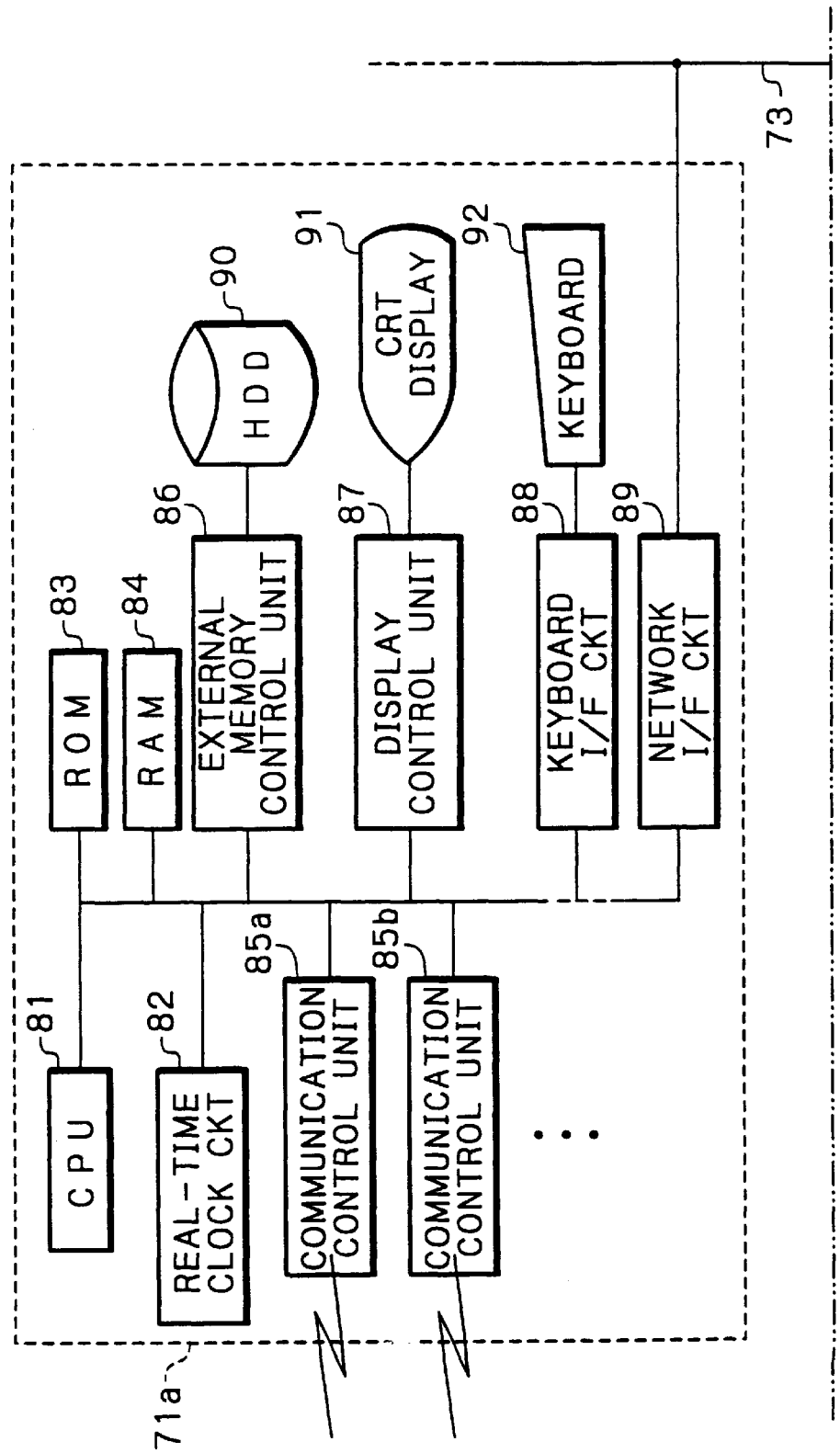

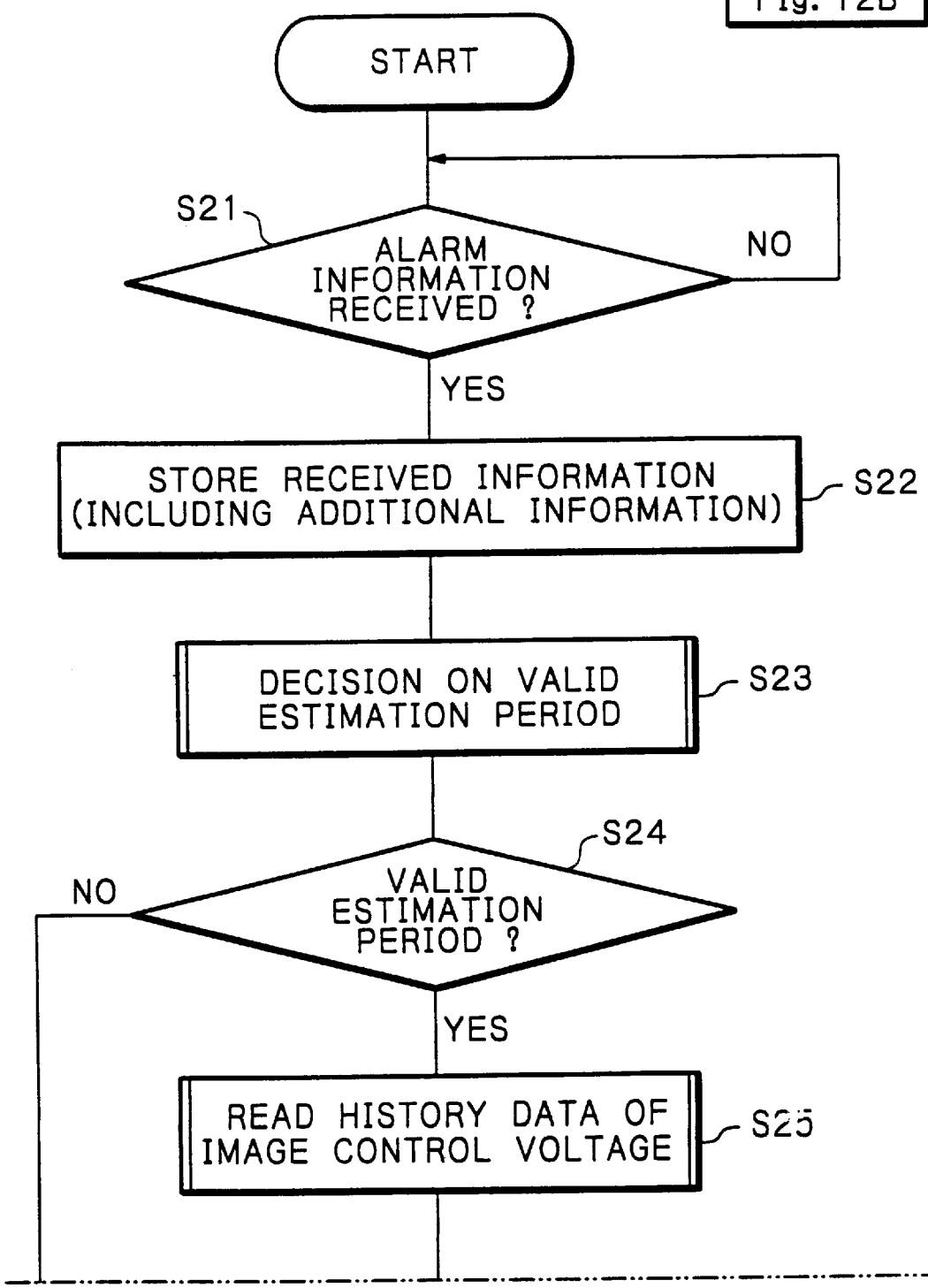

SERVICE SYSTEM FOR IMAGE FORMING APPARATUSES

BACKGROUND OF THE INVENTION

The present invention relates to a service system capable of managing a number of copiers, facsimile apparatuses, printers or similar image forming apparatuses located at users' stations for promoting rapid and adequate maintenance or repair.

Today, a number of copiers, facsimile apparatus and other image forming apparatuses using papers are operated in various industrial fields. It is difficult with this kind of apparatus to fully obviate paper jams, defective images and other troubles. In light of this, the apparatus is constructed such that the user of the apparatus can settle such troubles as far as possible and restore the apparatus to its normal condition.

However, a paper jam, defective image or similar trouble of the kind which only a trained serviceman can deal with sometimes occurs in the apparatus. It is therefore a common practice for the user to make a maintenance contract with the manufacturer or the distributor of the apparatus. The contract covers not only periodic inspection and maintenance by a serviceman, but also rapid repair for dealing with troubles.

Japanese Patent Laid-Open Publication Nos. 3-293369 and 5-80609, for example, each disclose a system in which a single central control unit is connected to a number of copiers each being located at a particular place by a telephone network or similar network. The central control unit, i.e., a computer situated at a control center receives information representative of paper jams and other troubles from the copiers and collectively controls the copiers by remote control.

In a copier managing system taught in the above Laid-Open Publication No. 3-293369, each copier detects and counts paper jams occurred therein position by position and calculates, every time a jam occurs and every time a paper is discharged, the frequency of jams (maximum value, minimum value, mean value, mean value of deviations, etc.) occurred during the latest preselected number of times of copying (e.g. 1,000 times). When the frequency exceeds preselected allowable one assigned to any position, the copier sends alarm data or similar control data representative of the frequent jam to the central control unit via a public telephone network. This allows the control center to see the frequent jam of the copier immediately and, e.g., send a serviceman to the user's station.

Also, a copier taught in Laid-Open Publication No. 5-80609 is constructed to detect and store, position by position, paper jams or similar transport errors occurred during an image forming sequence. When a transport error occurs before a preselected number of copies are output or within a preselected time interval or when transport errors of the same kind continuously occur, the copier sends stored transport error information to a host computer situated at a control station via a public circuit. A person or operator at the control station can see the received transport error information on, e.g., a display.

However, in each of the above conventional service systems, a particular service center or central control unit is assigned to each area and cannot control image forming apparatuses not lying in the other areas. This obstructs efficient user support using carefully thought out graphs and reports listing various kinds of information relating to the apparatuses, e.g., area-by-area, apparatus-by-apparatus and factor-by-factor numbers of images formed and other information associated with the operation.

It has been customary with the above image forming apparatus to replace each expendable or replaceable part at a particular time based on the number of papers, operation time or change in condition from the stable quality standpoint. For example, a serviceman replaces each expendable by determining, based on manufacturer's reference control information, whether or not the total number of papers of the apparatus and the number of papers used after the last replacement of the expendable each have exceeded a reference number. This forces the serviceman to perform troublesome work for the management of expendables apparatus by apparatus.

Some modern image forming apparatuses applicable to a service system have a function of sending, when a trouble of the kind which cannot be automatically detected (factor to be reported) occurs, information representative of the trouble to a central control unit. To report such a trouble, however, the user of the apparatus has to operate keys according to a preselected troublesome sequence.

Further, in the conventional service systems, each image forming apparatus stores information representative of paper jams, defective images and other errors and determines a time for sending the stored information to the central control unit. The central control unit simply receives the information and reports them to the operator via, e.g., a display. The operator therefore has to determine or estimate the occurrence of a trouble on the basis of the above information and to determine whether or not to send a serviceman. In addition, the operator has to request, if necessary, a serviceman at a service station to visit the user's station via telephone or facsimile while selectively providing the serviceman with necessary information relating to the user's apparatus and conditions thereof.

Moreover, if all the information received from the image forming apparatus are sent to the service station, the serviceman has to determine whether or not the information are representative of a critical trouble or a simple report of current conditions. This consumes extra time and labor as well as extra communication cost. Should information to be sent from the image forming apparatus and a timing for sending them be noticeably limited, as stated earlier, it would be impracticable to estimate a trouble or the need for a serviceman (remote diagnosis).

SUMMARY OF THE INVENTION

It is therefore an object of the present invention to provide an image forming apparatus service system capable of realizing efficient user support using carefully thought out graphs and reports listing various kinds of information on image forming apparatuses.

It is another object of the present invention to provide an image forming apparatus service system capable reducing the serviceman's work for the management of expendables included in an image forming apparatus.

It is still another object of the present invention to provide an image forming apparatus service system capable of freeing the user of an image forming apparatus from troublesome operation for sending a report to a central control unit.

It is a further object of the present invention to provide an image forming apparatus service system capable of automating a serviceman request based on image control voltages sent from each image forming apparatus and thereby allowing an adequate measure to be rapidly taken before a critical trouble occurs.

In accordance with the present invention, in an image forming apparatus service system, each image forming apparatus adds, when an abnormal or preabnormal phenomenon or similar factor to be reported occurs therein, information relating to its operation and including the cumulative number of images formed to information representative of the above factor. The information and additional information are sent to a central control unit managing the image forming apparatus. Each central control unit collects and stores the information received from image forming apparatuses lying in its coverage apparatus by apparatus and transfers the day's (one day) information stored to a server at a preselected time via a WAN (Wide Area Network). The server stores the information received from all the central control units in a format suitable for a data base. A person using each data processing unit is capable of downloading desired information from each central control unit or the server via the WAN by operating a keyboard or a mouse.

BRIEF DESCRIPTION OF THE DRAWINGS

The above and other objects, features and advantages of the present invention will become more apparent from the following detailed description taken with the accompanying drawings in which:

FIG. 3 is a block diagram schematically showing a specific configuration of a part of the copier;

FIG. 6 is a block diagram schematically showing a specific configuration of another part of the copier;

FIG. 7 is a block diagram schematically showing a specific configuration of still another part of the copier;

DESCRIPTION OF THE PREFERRED EMBODIMENT

Figure 1:
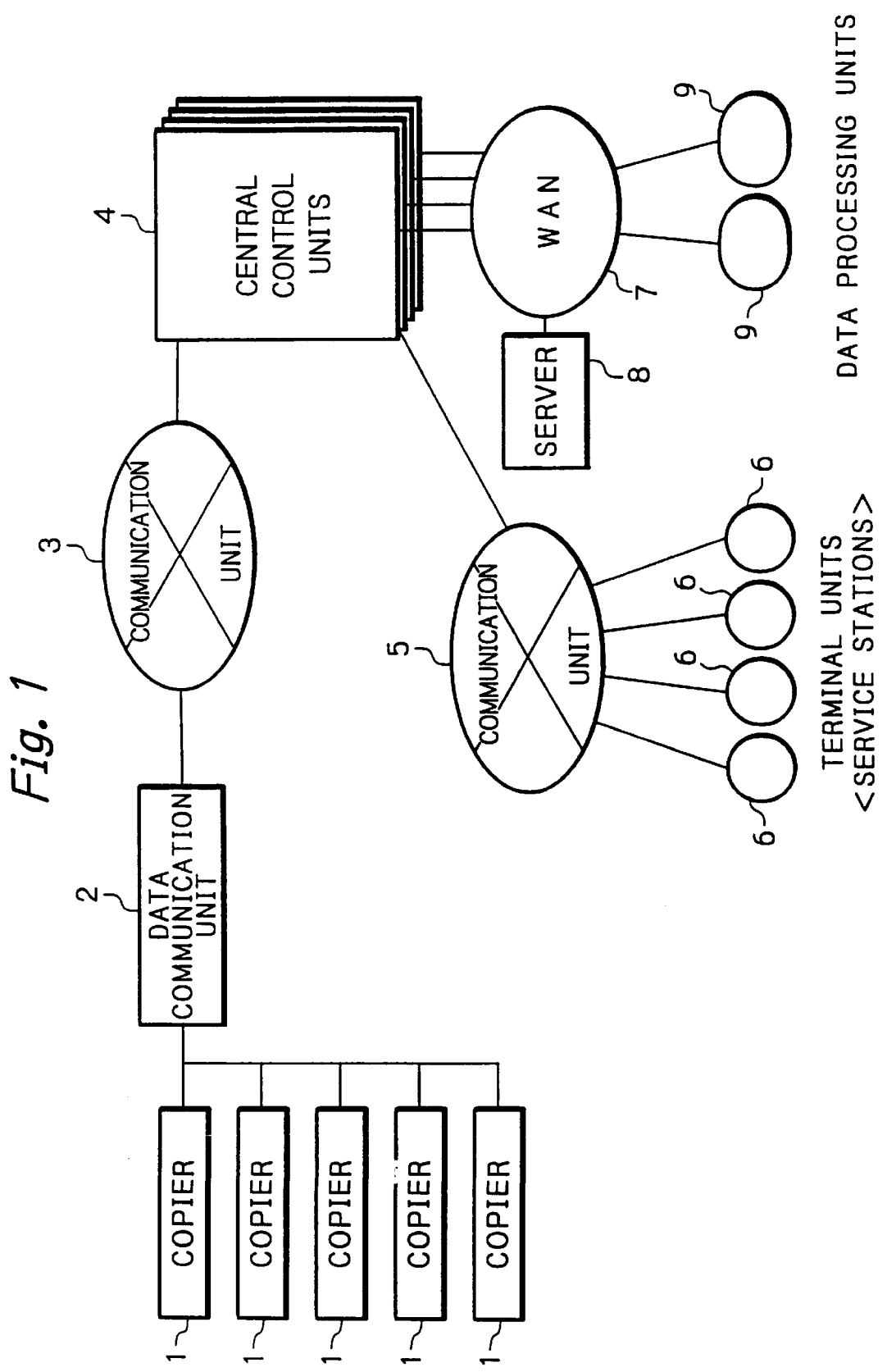
FIG. 1 is a block diagram schematically showing an image forming apparatus service system embodying the present invention.

Referring to FIG. 1 of the drawings, an image forming apparatus service system embodying the present invention is shown. As shown, a number of copiers 1 are situated at, e.g., users offices. The copiers 1 are representative of image forming apparatuses and may, of course, be replaced with facsimile apparatuses by way of example. The copiers 1 each are connected to one of central control units 4 controlling it via a data communication unit 2 and a communication unit 3.

Each central control unit 4 is located at a service center covering a particular area. Terminal units 6 each are located at a particular service station and connected to one central control unit 4 via a communication unit 5. The communication units 3 and 5 may be implemented by a telephone network or similar public network. A server 8 and data processing units 9 are connected to the central control units 4 via a WAN (Wide Area Network) 7 which is a specific form of a communication network.

Each copier 1 reports to the associated central control unit 4 an abnormal phenomenon, preabnormal phenomenon or similar preselected factor occurred therein. For example, when a paper jam repeatedly occurs a preselected number of times in a certain copier 1 or when a preselected period of time expires, the copier 1 sends information representative of such an occurrence to the central control unit 4. At this instant, the copier 1 adds information relating to its operation and including a cumulative number of copies, i.e., images produced or an image control voltage to the above information. In this sense, the copier 1 plays the role of sending means.

Further, the copier 1 plays the role of reference information setting means, coincidence deciding means, information outputting means, and reference information canceling means. The reference information setting means sets reference information for determining a time for replacement part by part, e.g., a number of copies, an operation time or a change in condition. The coincidence deciding means determines, part by part, whether or not the number of copies, operation time, change in condition or similar information, as counted from the last replacement, is coincident with the corresponding reference information set by the reference information setting means. When the result of decision output from the deciding means shows that a certain part should be replaced, the information outputting means outputs information indicative of the part to be replaced together with information for demanding maintenance. The reference information canceling means cancels the reference information set by the reference information setting means.

An ID (identification) card or similar input medium may be removably mounted to each copier 1. Further, the copier 1 additionally serves as reading means for reading data stored in the input medium, recognizing means for recognizing the contents of the data read out of the input medium, report command deciding means for determining whether or not a report command exists on the basis of the above recognition, and reporting means for reporting, if a report command exists, information corresponding to the command to the associated central control unit 4.

Moreover, the copier 1 serves as identifying means, report commanding means, displaying means, and selecting means. When a report command exists, as determined by the recognizing means, the identifying means identifies the kind of a report on the basis of the result of recognition. The report commanding means causes the reporting means to send the kind of a report identified. Alternatively, when a report command exists, the displaying means may display the kinds of reports available with the copier 1 thereon. In such a case, the selecting means allows the user of the copier 1 watching the displaying means to select one of the kinds of reports, and the report commanding means causes the reporting means to send the kind of a report selected.

Each central control unit 4 serves as information collecting and storing means (including voltage information collecting and storing means) for receiving information from the copiers 1 lying in its own coverage and collecting and storing them copier by copier. Also, the central control unit 4 serves as analyzing means (including image diagnosing means) for analyzing the information stored in the above means at a preselected timing. Further, the central control unit 4 serves as estimating means for estimating, based on the result of analysis, the occurrence of a trouble (including an error in an image forming section) and the need for a serviceman's visit. In addition, the central control unit 4 plays the role of transmitting means for sending, if a serviceman is required, necessary information (relating to the maintenance or repair of the copier 1 which requires a serviceman) to the terminal unit 6 located at the service station in charge of the above copier 1.

The terminal units 6 each are implemented by a minicomputer or a personal computer. Each terminal unit 6 stores the information received from the central control unit 4 and reports the location of the faulty copier 1 to a serviceman while displaying the conditions of the copier 1.

The server 8 is an information collecting and storing unit for collecting and storing via the WAN 7 information stored in servers, or information collecting and storing means, built in the central control units 4, as will be described specifically later.

The data processing units 9 are personal computers, work stations or similar computers situated at various departments including a sales department, a service department, a design department and a planning department. Each data processing unit 9 is capable of downloading necessary information relating to operation from the servers of the central control units 4 or the server 8 via the WAN 7.

Figure 2:
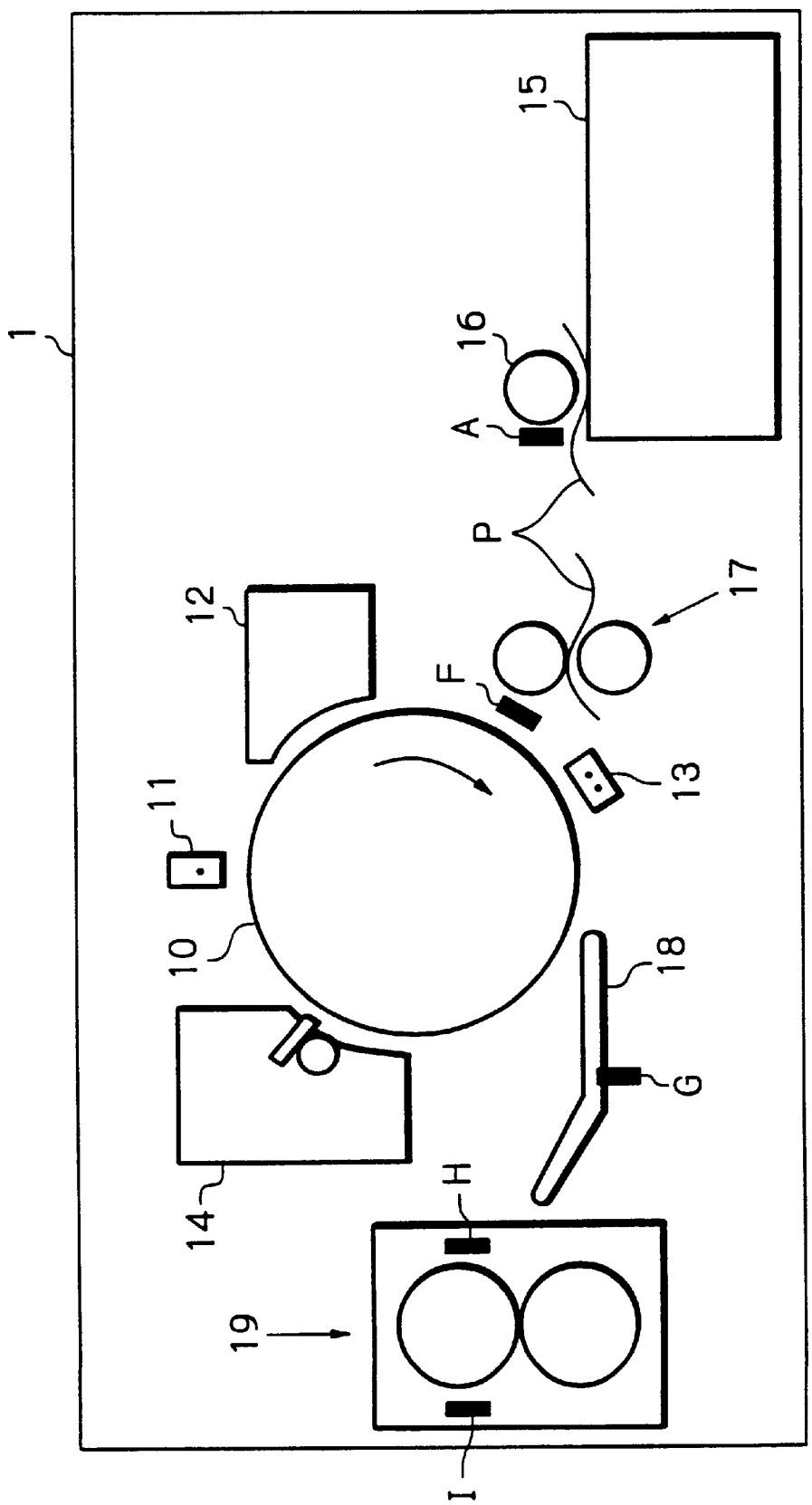
FIG. 2 is a view showing various image forming sections of each copier included in the system of FIG. 1 and sensors arranged on the paper transport path of the copier.

Reference will be made to FIG. 2 for describing a specific configuration of each copier 1 for forming an image and sensing a paper or similar recording medium. As shown, the copier 1 includes a photoconductive element implemented as a drum 10. A main charger 11, a developing device 12, a transfer charger 13 and a cleaning unit 14 are arranged around the drum 10.

While the drum 10 is rotated in a direction indicated by an arrow in FIG. 2, the main charger 11 uniformly charges the surface of the drum 10. A scanner and optics for exposure, not shown, scan the charged surface of the drum 10 in accordance with image data to thereby electrostatically form a latent image. The developing device 12 develops the latent image with toner. A pick-up roller 16 feeds papers P stacked on a tray 15 to a registration roller pair 17 one by one. The registration roller pair 17 drives the paper P to an image transfer station at a preselected timing. At the image transfer station, the transfer charger 13 transfers atoner image from the drum 10 to the paper P. The paper with the toner image is conveyed to a fixing unit 19 including a heat roller, not shown, by a belt or similar conveyor 18. After the toner image has been fixed on the paper P by the fixing unit 19, the paper P is driven out of the copier 1.

After the image transfer from the drum 10 to the paper P, the cleaning unit 14 cleans the surface of the drum 10 and thereby prepares it for the next image formation.

Reflection type or transmission type sensors are arranged at preselected positions on a transport path along which the paper P is conveyed. Specifically, a paper feed sensor A is located at the outlet side of the pick-up roller 16. A registration sensor F is positioned at the outlet side of the registration roller pair 17. A conveyance sensor G is located in the vicinity of the conveyor 18. A fixation sensor H is positioned at the inlet side of the fixing unit 19. A discharge sensor I is positioned at the outlet side of the fixing unit 19. By monitoring the outputs of the above sensors and paper transport times, it is possible to detect defective paper transport, i.e., a paper jam and a position where it has occurred. When a paper jam occurs, the copier 1, like the conventional copier, displays it on an operation and display panel thereof and stops operating.

FIG. 3 shows a part of the copier 1. As shown, the copier 1 includes an operation and display panel 20 on which various keys (switches) including a start key and numeral keys and a display are arranged. Standard jam values (numerical values corresponding to numbers of copies) can be input on the operation and display panel 20 position by position as reference values for determining whether or not the degree of a paper jam occurred is critical. Specifically, a particular standard jam value may be input on the panel 20 for each jam alarm counter 27, taking account of the user characteristics including the user's emotion factor and environmental factor. Also, default values particular to the copier 1 and stored beforehand may be corrected on the panel 20. Further, a reference value for determining whether or not to cause each jam alarm counter 27 to output jam alarm information may be input on the panel 20.

A copy sequence controller 21 controls the copy sequence of the copier 1 and is implemented by a microcomputer. When the start key on the operation and display panel 20 is pressed, the copy sequence controller 21 sequentially controls the various sections of FIG. 2 and scanner and optics as well as motors, clutches and high-tension power sources for thereby controlling a procedure for copying a document image on a paper. Also, the copy sequence controller 21 controls the entire operation of the copier 1. Condition sensors 22 are responsive to temperature (and humidity) in the copier 1, fixing temperature, surface temperature of the drum 10, presence/absence of supplies, etc.

A addition information storage 23 stores information relating to the conditions or operation of the copier and represented by the outputs of the copy sequence controller 21 and condition sensors 22 as additional information. The additional information includes a cause or a position of a paper jam, a paper size, a count (total count or TC) output from a total counter built in the copy sequence controller 21 for counting the total number of copies, an operation time of the pick-up roller, a fixing temperature or an image control voltage during a copying operation (including a toner content control voltage). A copy counter 24 receives a count signal from the copy sequence controller 21 every time a single copy is discharged, and thereby counts copies discharged without any jam.

An alarm level storage 25 stores an alarm level beforehand or stores its input on the operation and display panel 20. The alarm level is a standard jam value assigned to a first position where the sensor A is located, i.e., a number of copies produced without any jam necessary for determining whether or not jam information is valid and resetting a jam alarm count. The alarm level 25 storage is implemented by a nonvolatile memory. A comparator 26 receives a count output form the copy counter 24 and the alarm level output from the alarm level storage 25. When the count reaches the alarm level, the comparator 26 feeds a coincidence signal to the jam alarm counter 27.

When the jam alarm counter 27 receives a jam signal from a jam detector 28, the jam alarm counter 27 increments a jam alarm count by 1 (one) and feeds a reset signal to the copy counter 24 for resetting the copy count. In addition, when the jam alarm counter 27 receives the coincidence signal from the comparator 26, but the jam alarm count is not zero, the jam alarm counter 27 resets the jam alarm count, i.e., clears it to zero. When the jam alarm count reaches a reference value (e.g. "10"), the jam alarm counter 27 delivers to a transmitter 29 jam alarm information indicating that the probability of frequent paper jam is great. More specifically, the jam alarm information is representative of an abnormal or a preabnormal phenomenon. At the same time, the jam alarm counter 27 feeds a reset signal to the copy center 24 for resetting the copy count.

While a copying operation is effected under the control of the copy sequence controller 21, the jam detector 28 monitors the output of the paper feed sensor A, FIG. 2, in relation to the paper transport time to thereby determine whether or not a paper jam has occurred. Specifically, if the paper feed sensor A does not sense a paper within a preselected period of time since the start of paper feed or if it continuously senses a paper over a preselected period of time, the jam detector 28 determines that the paper has jammed the transport path. In this case, the jam detector 28 delivers a jam signal associated with the first position to the jam alarm counter 27. Also, the jam signal causes the copy sequence controller 21 to stop the copying operation and causes the paper jam and the position thereof to appear on the operation and display panel 20. Usually, the operator watching the display is expected to remove the jammed paper and restore the copier 1 to its normal condition.

The paper feed sensor A, jam detector 28, copy counter 24, alarm level storage 25, comparator 26 and jam alarm counter 27 constitute a jam alarm processor 30A assigned to the first position.

Jam alarm processors 30F, 30G, 30H and 30I are respectively assigned to a second position, a third position, a fourth position and a fifth position and connected between the operation and display panel 20 and copy sequence controller 21 and the transmitter 29. The jam alarm processors 30F–30I are identical with the jam alarm processor 30A except for the substitution of the registration sensor F, conveyance sensor G, fixation sensor H and discharge sensor I for the paper feed sensor A.

In the jam alarm processor 30F assigned to the second position, the jam detector 28 monitors the output of the registration sensor F in relation to the paper transport time to thereby determine whether or not a paper jam has occurred. Specifically, assume that the registration sensor F does not sense a paper within a preselected period of time since the paper feed sensor A located upstream of the registration sensor F in the direction of paper transport has sensed it, or that the registration sensor F continuously senses it over a preselected period of time. Then, the jam detector 28 determines that the paper has jammed the transport path. In this case, the jam detector 28 delivers a jam signal associated with the second position to the jam alarm counter 27 included in the jam alarm processor 30F. As for the rest of the configuration, the jam alarm processor 30F is identical with the jam alarm processor 30A.

In each of the other jam alarm processors 30G, 30H and 30I assigned to the third, fourth and fifth positions, respectively, the jam detector 28 also monitors the output of the associated one of the conveyance sensor G, fixation sensor H and discharge sensor I in relation to the paper transport time. If any one of the sensors 30G–30I does not sense a paper within a preselected period of time since the sensor located upstream of the sensor or if the sensor continuously senses a paper over a preselected period of time, the jam detector 28 associated with the sensor determines that a paper jam has occurred. Then, the jam detector 28 delivers a jam signal to the jam alarm counter 27. As for the rest of the configuration, the jam alarm processors 30G, 30H and 30I each are identical with the jam alarm processor 30A.

Again, the jam signal output from any one of the jam alarm processors 30F–30I causes the copy sequence controller 21 to stop the copying operation and causes the paper jam and the position thereof to appear on the operation and display panel 20. Usually, the operator watching the display is expected to remove the jammed paper and restore the copier 1 to its normal condition.

The outputs of the sensors A and F–I may be directly input to the copy sequence controller 21, if desired. In such an alternative configuration, the copy sequence controller 21 will include jam detecting means capable of detecting paper jams position by position.

The transmitter 29 sends jam alarm information output from the jam alarm counters 27 of the jam alarm processors 30A and 30F–30I to the associated central control unit 4 via the data communication unit 2 and communication unit 3 shown in FIG. 1. More specifically, the transmitter 29 sends condition information read out of the condition information storage 23 and an ID assigned to the copier 1 together with the above jam alarm information. The condition information include the causes of paper jams and TC and other values relating to the operation. Further, when any other abnormal or preabnormal phenomenon, e.g., SC (Serviceman Call) or a sensor error or MC (Manual Call) occurs, the transmitter 29 is capable of sending information representative of such a factor to the central control unit or host computer 4.

The jam alarm processors 30A and 30F–30I each validate or invalidate the jam alarm information, as follows. The jam alarm counters 27 respectively assigned to preselected positions of the copier 1 each count jam signals output from the associated jam detector 28 and output jam alarm information when the count coincides with the reference value, as stated earlier. However, when the count output from any one of the copy counters 24, i.e., the number of copies output without any jam reaches the alarm level stored in the alarm level storage 25, the jam alarm counter 27 resets the existing count and does not output any jam alarm information. This will be described specifically with reference to FIG. 4.

The count (alarm counter hereinafter) of the jam alarm counter 27 is incremented by 1 only if the count is not greater than the standard jam value or alarm level. Assume that the standard jam value is 1,000. Then, in FIG. 4, the jam alarm counter is incremented when a paper jam is detected before the number of copies N increases to N+1,000. Subsequently, the jam alarm counter is again incremented when a paper jam is detected before another 1,000 copies are produced.

Figure 4:
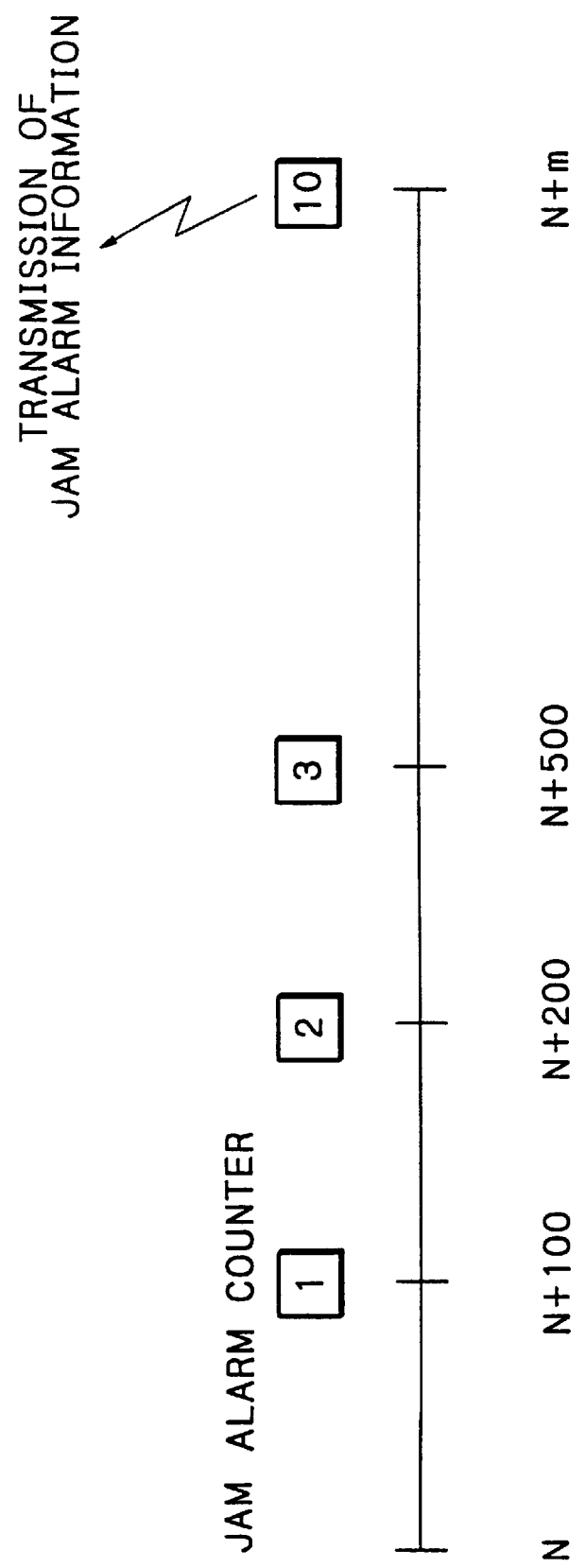
FIG. 4 is a chart demonstrating a specific operation of a jam alarm counter included in the copier.

In the specific case shown in FIG. 4, paper jams occur when the number of copies is N+100, N+200 and N+500, so that the jam alarm counter is sequentially incremented to "1", "2" and "3". Jam information so incrementing the jam alarm counter are valid. More specifically, assume that a value involving the cause of some error is repeatedly input to the jam alarm counter 27 a preselected number of times (ten times in this case) assigned to the same position. Then, it is determined that the probability of frequent paper jam at the above position and ascribable to some cause is extremely great. In this case, jam alarm information is output and sent to the central control unit 4. In FIG. 4, jam alarm information is sent when the alarm counter reaches "10" at the "N+m" copy.

However, assume that after the increment of the jam alarm counter from "1" to "3" in FIG. 4, meaning that a paper jam has occurred three times up to the "N+500" copy, the cause of an error disappears due to, e.g., come-off of dust from a paper feed clutch and allows the number of copies to exceed the standard jam value. Then, it can be safely determined that the future probability of frequent jam is small. More specifically, it can be determined that the current data existing in the jam alarm counter is different from the cause of future jams and has no influence on it. Therefore, the alarm information is invalidated. In this case, the alarm counter is reset in order to delete the invalid information. This successfully enhances the accuracy of jam alarm information.

As stated above, in the illustrative embodiment, the jam alarm processors including the respective jam alarm counters 27 each are assigned to a particular position where paper jams are apt to occur. When a paper jam occurs at any one of the positions, but within a standard number of copies as counted from the previous count or from the previous resetting, the jam alarm counter 27 assigned to the above position increments its jam alarm counter by 1, determining that the jam alarm information is valid. However, if the number of copies is greater than the standard number, the jam alarm counter 27 resets its jam alarm counter, determining that the jam alarm information is invalid. By repeating such a decision, the jam alarm counter 27 counts only recent valid jams.

When the jam alarm counter reaches a preselected reference value, e.g., N=10, jam alarm information indicative of frequent jam apt to occur at the above position in the near future is output and sent to the central control unit 4 via the transmitter 29 together with additional information mentioned earlier.

As for the reference values or counts for outputting jam alarm information position by position, default values particular to the copier 1 may also be stored beforehand or input on the operation and display panel 20. Such reference values, like the standard jam values or alarm levels particular to the copier 1, are freely variable to the user's taste or in matching relation to the recent operating conditions of the copier 1.

Further, as for the position-by-position standard jam value, there may be separately set a value for the jam alarm counter 27 to determine whether or not to count jam information and a value for it to determine whether or not to reset the count of jam information.

Figure 5B:
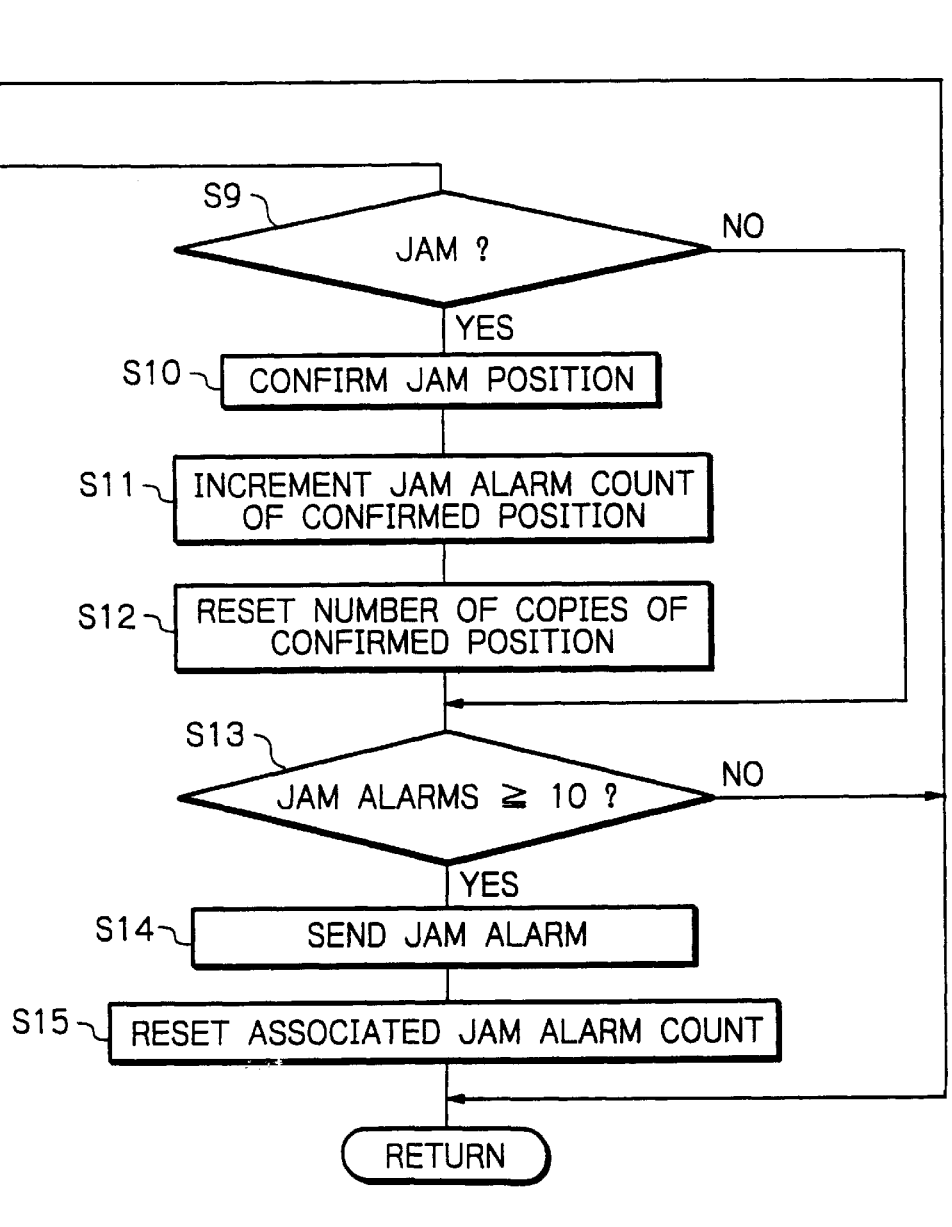
FIG. 5 is a flowchart representative of a specific jam alarm procedure particular to the copier.

Referring to FIG. 5, the above jam alarm processing to be executed by each copier 1 will be described more specifically. As shown, in a step S1, whether or not the copier 1 is in operation is determined. The routine to be described is validated only if the copier 1 is in operation; if otherwise, the program simply returns to a main routine via this routine. If the answer of step S1 is positive (Y), whether or not a timing for counting the number of copies is reached (step S2). If the answer of step S2 is Y, a position for detecting jams is confirmed (step S3). Subsequently, the number of copies associated with the above position is incremented by 1 (step S4). If the answer of step S2 is negative (N), the operation is transferred to a step S9.

After step S4, the number of copies actually output and the alarm level associated with the above position are compared (step S5). If the number of copies is greater than or equal to the alarm level, e.g., 100 copies (Y, step S5), the jam alarm count associated with the particular position is reset (step S6), and the number of copies is also reset (step S7). If the answer of step S5 is N, the operation is transferred to a step S8.

In the step S8 following step S7 or step S2, whether or not steps S3–S7 have been executed with all the positions corresponding to the sensors A and F–I, FIG. 2. If the answer of step S8 is N, the program returns to step S3 for repeating steps S3–S7 with the next position.

If the answer of step S8 is Y, whether or not a jam has occurred is determined (step S9). If the answer of step S9 is Y, a position where the jam has occurred is determined (step S10). Then, the count of jam alarms associated with the above position is incremented by 1 (step S11) while the number of copies associated with the same position is reset (step S12) If the answer of step S9 is N, the operation is transferred to a step S13.

After the step S12 or if the answer of step S9 is N, the count of jam alarms at the particular position is coincident with the reference value ("10" in this case) is determined (step S13). If the answer of step S13 is Y, jam alarm information is sent together with operation information and copier ID (step S14). Subsequently, the jam alarm count is reset (step S15). If the answer of step S13 is Y, the program returns to the main routine.

With the above procedure, it is possible to effect accurate detection of the future probability of frequent jam position by position and send jam alarm information to the central control unit 4 with a relatively simple construction not needing a large capacity memory. This obviates the transmission of needless information to the central control unit 4 and thereby reduces communication cost. In addition, the central control unit 4 can easily estimate the occurrence of a trouble, i.e., whether or not a serviceman is required.

In the above embodiment, each copier 1 sends jam alarm information to the associated central control unit 4. Alternatively, the copier 1 may send any other alarm information to the central control unit 4 at a preselected timing, e.g., at a preselected time or every time a preselected period of time elapses.

FIG. 6 shows another part of each copier 1. As shown, the copier 1 includes, in addition to the various sections of FIG. 3, a use information counter 31, a reference information storage 32, a reference decision 33, an information storage 34, and an output processor 35. The replaceable parts or expendables of the copier 1 include a pick-up roller, a clearing blade, a fur brush, a main charger, a halogen lamp, and a heat roller.

When the copier 1 is in operation, the use information counter 31 counts (increments) or measures information relating to the use of the copier 1 part by part. Such information includes a number of copies produced, an operation time and various kinds of condition information including a toner content control voltage. When the reference decision 33 determines that any one of the part-by-part count or measured value has reached a corresponding reference information for replacement stored in the reference information storage 32, the reference decision 33 sends a reset signal to the use information counter 31 for resetting it. The reference information storage 32 is a parameter table storing numbers (or names) attached to the various parts and the reference numbers of copies, operation times, changes in state or similar part-by-part reference information for replacement. The reference information for replacement can be input on the operation and display panel 20, FIG. 3, as desired.

For example, when the pick-up roller reaches its limit of use at, e.g., the 40,000th copy, repair will be frequently needed after the production of more than 40,000 copies. It is therefore desirable to replace the pick-up roller before 40,000 copies are produced, e.g., when 30,000 copies are produced. It follows that the reference number of copies for replacement may advantageously be 30,000, i.e., 4,000 multiplied by a safety factor.

The reference decision 33 compares the part-by-part counts or measured values output from the use information counter 31 and the part-by-part reference information stored in the reference information storage 32. By the comparison, the reference decision 33 determines whether or not the count or measured value and the reference value are coincident part by part. If any one of the counts or measured values is coincident with the corresponding reference value, the reference decision 33 delivers the number or name attached to the part with the above count or measured value to the information storage 34.

Alternatively, the reference decision 33 may decrement (−1) the part-by-part reference information, i.e., reference numbers of copies or reference operation times stored in the reference information storage 32 and deliver the number or name of a particular part whose reference number has been decremented to zero to the information storage 34. This allow the use information counter 31 to be omitted.

The information storage 34 stores the part-by-part information including numbers or names attached to the replaceable parts, recycling information, and redesign management numbers. On receiving the number or name of a replaceable part from the reference decision 33, the information storage 34 searches for necessary information and delivers them to the output processor 35 together with information for demanding maintenance in the form of a list.

The output processor 35 may transfer the list received from the information storage 34 to the operation and display unit 20 so as to display it or may transfer it to the image forming section (see FIG. 2) so as to print the information on a taper. Further, the output processor 35 may send the above list to the central control unit 4 via the data communication unit 2 and communication unit 3, so that the list can be displayed on a client computer, which will be described later, or printed on a paper.

If desired, the part-by-past reference information for replacement may be input on the operation and display panel 20 in some groups. For example, assume that the pick-up roller, cleaning blade, fur brush and main charger reach the limit of use when 30,000 copies are output, that the halogen lamp reaches the limit of use when 60,000 copies are output, and that the heat roller reaches the limit of use when 240,000 copies are output. Then, the pick-up roller, cleaning blade, fur brush and main charger having the same limit of use may be set on the operation and display panel 20 in a single group while the halogen lamp and heat roller may be set independently of each other.

The reference information for replacement may be selected in consideration of the user characteristics including the emotion factor and environmental factor. In addition, the reference information may be selectively canceled on the operation and display panel 20 and deleted from the reference information storage 32.

The configuration shown in FIG. 6 makes it needless for a serviceman to replace or manage the various expendables by comparing the total number of copies and part-by-part numbers of copies and reference numbers set by the manufacturer beforehand. This eases the serviceman's work for managing the various expendables of the copier 1.

FIG. 7 shows still another part of each copier 1. As shown, the copier 1 allows an ID card or similar input medium 111 particular to the copier 1 to be removably mounted thereto. The copier 1 includes an information reader 112, a content recognition 113, a report command decision 114, and an MC processor 115.

The information reader 112 reads information out of the ID card 111 removably mounted to the copier 1. The content recognition 113 recognizes the content of information read by the information reader 112. The report command decision 114 determines, based on the recognized content, whether or not a report command is present. When the report command decision 114 determines that a report command is present, the MC processor 115 sends information (MC information) relating to the command to the central control unit 4 via the data communication unit 2 and communication unit 3. In response, the central control unit 4 may display the received information on its client computer or print it out on a paper.

An arrangement may be made such that when a report command exists, as determined by the report command decision 114, the kind of a report is identified on the basis of the output of the content recognition 113 and sent via the MC processor 115. Alternatively, the kinds of information available with the copier 1 may be displayed on the operation and display panel 20 in order to allow the operator to select one of them on the keys of the operation and display panel 20.

In the above configuration, when a trouble of the kind which the copier 1 cannot automatically detect occurs in the copier 1, the IC card 111 is mounted to the copier 1 in order to send information representative of the trouble to the central control unit 4 immediately. The user is therefore free from troublesome operation of the keys of the operation and display panel 20. In addition, maintenance based on the report using the ID card 111 enhances the quality of the copier 1.

Hereinafter will be described specific configurations of each central control unit 4, terminal unit 6, and data processing unit 9.

Figure 8:
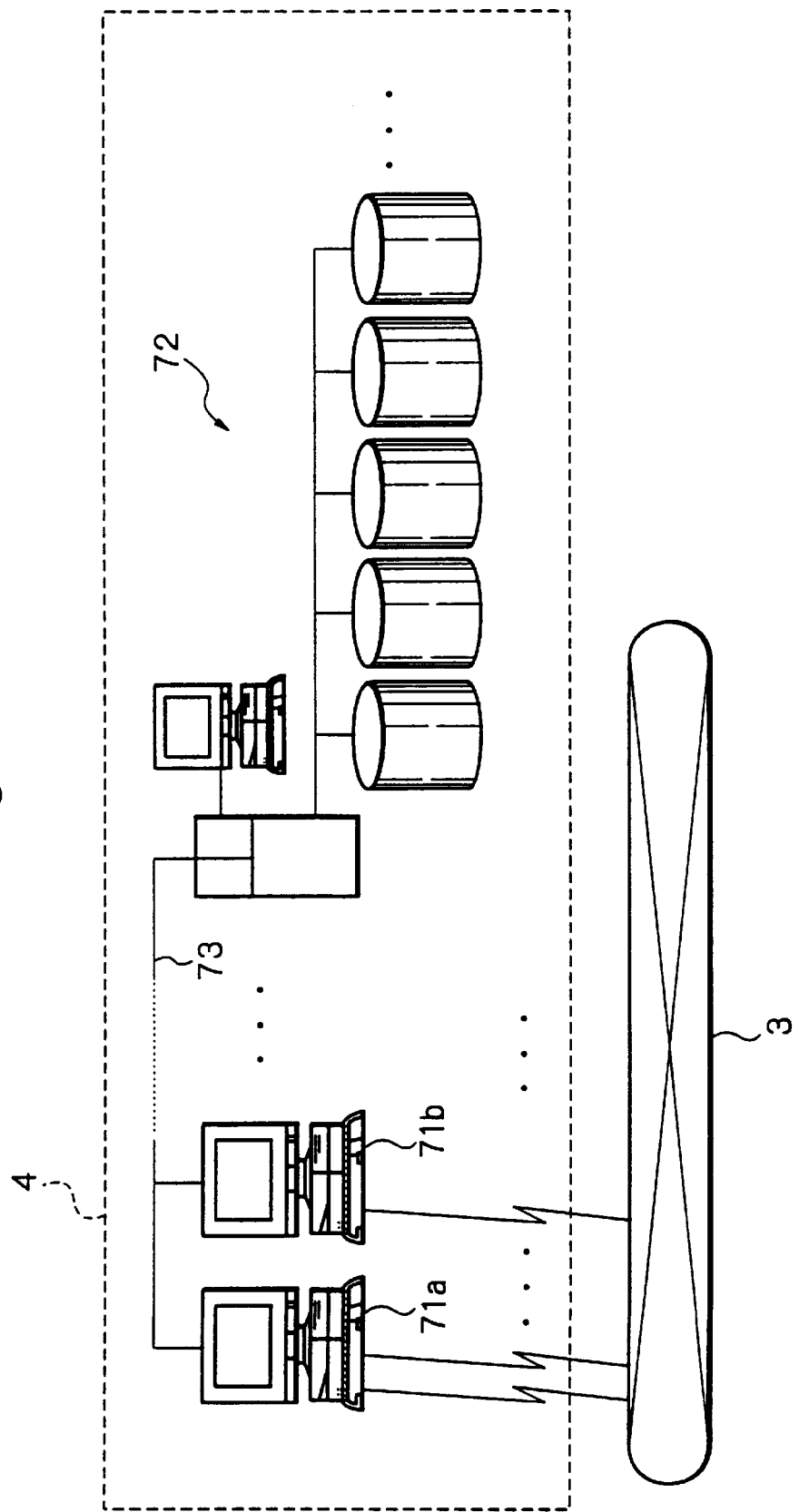
FIG. 8 is a block diagram schematically showing a specific configuration of each central control unit included in the system of FIG. 1.

FIG. 8 shows a specific configuration of each central control unit 4. As shown, the central control unit 4 is a center system including a plurality of client computers (simply clients hereinafter) 71a, 71b and so forth, a server 72, a printer, a facsimile apparatus and other image forming apparatuses, not shown, and a LAN (Local Area Network) 73 connecting them together.

Figure 9B:
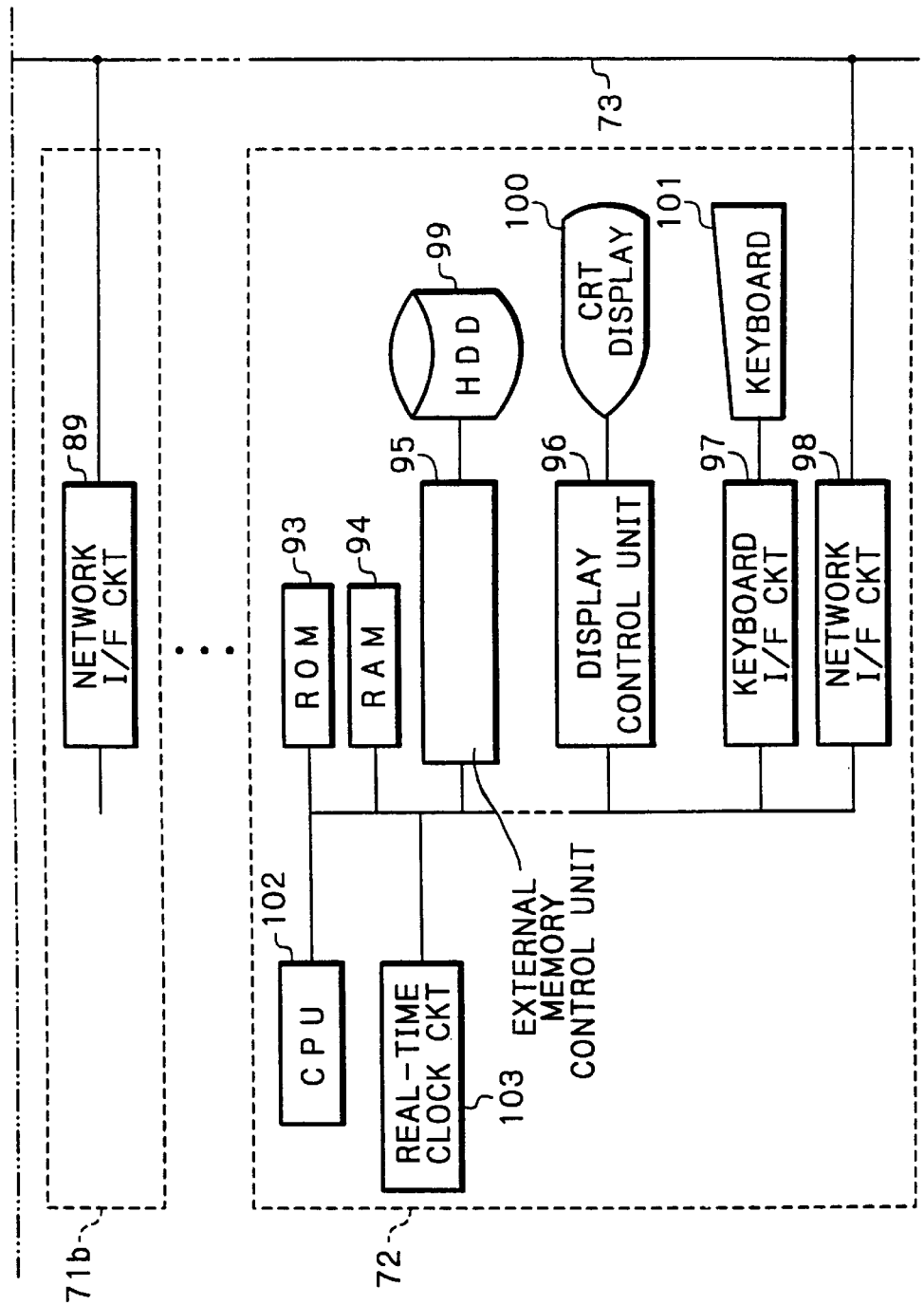
FIG. 9 is a block diagram schematically showing a specific arrangement of each client and a server included in the central control unit.

FIG. 9 shows a specific configuration of each of the clients 71a, 71b and so forth and a specific configuration of the server 72. As shown, the client 71a includes a CPU (Central Processing Unit) 81, a real-time clock circuit 82, a ROM (Read Only Memory) 83, a RAM (Random Access Memory) 84, communication control units 85a, 85b and so forth, an external memory control unit 86, a display control unit 87, a keyboard interface (I/F) circuit 88, a network I/F circuit 89, a hard disk drive (HDD) 90, a CRT (Cathode Ray Tube) display 91, and a keyboard 92. The client 71b is identical in configuration with the client 71a and simply represented by the network I/F circuit 89. The other clients are also identical with the client 71a and not shown in FIG. 9.

The CPU 81 totally controls the client 71a in accordance with a program stored in the ROM 83. The real-time clock circuit 82 generates time information and allows the CPU 81 to see the current time. The ROM 83 stores various fixed data to be used by the CPU 81 together with the above program. The RAM 84 plays the role of a work memory for the CPU 81.

The communication control units 85*a*, 85*b* and so forth each control communication with an external unit via the communication unit 3. The external memory control unit 86 is connected to the HDD 90 for an interfacing purpose. The keyboard I/F circuit 88 is connected to the keyboard 92 for an interfacing purpose. The network I/F circuit 89 interfaces the client 71*a* to the other clients including the client 71*b*, server 72, and image forming apparatuses.

The server 72 includes a CPU 102, a real-time clock circuit 103, a ROM 93, a RAM 94, an external memory control unit 95, a display control unit 96, a keyboard I/F circuit 97, a network I/F circuit 98, an HDD 99, a CRT display 100, and a keyboard 101.

The CPU 102 totally controls the server 72 in accordance with a program stored in the ROM 93. The real-time clock circuit 103 generates time information and allows the CPU 102 to see the current time. The ROM 93 stores various fixed data to be used by the CPU 102 together with the above program. The RAM 94 plays the role of a work memory for the CPU 102.

The external memory control unit 95 is connected to the HDD 99 for an interfacing purpose. Among the information received from the copiers 1, the information relating to the operation are written to the HDD 99 copier by copier. The display control unit 96 is connected to the keyboard 101 for an interfacing purpose. The network I/F circuit 98 interfaces the server 72 to the clients 71*a*, 71*b* and so forth and image forming apparatuses connected to the LAN 73.

Because the server 8 shown in FIG. 1 is identical in configuration with the server 72, the configuration of the server 8 will not be shown or described specifically.

Figure 10:
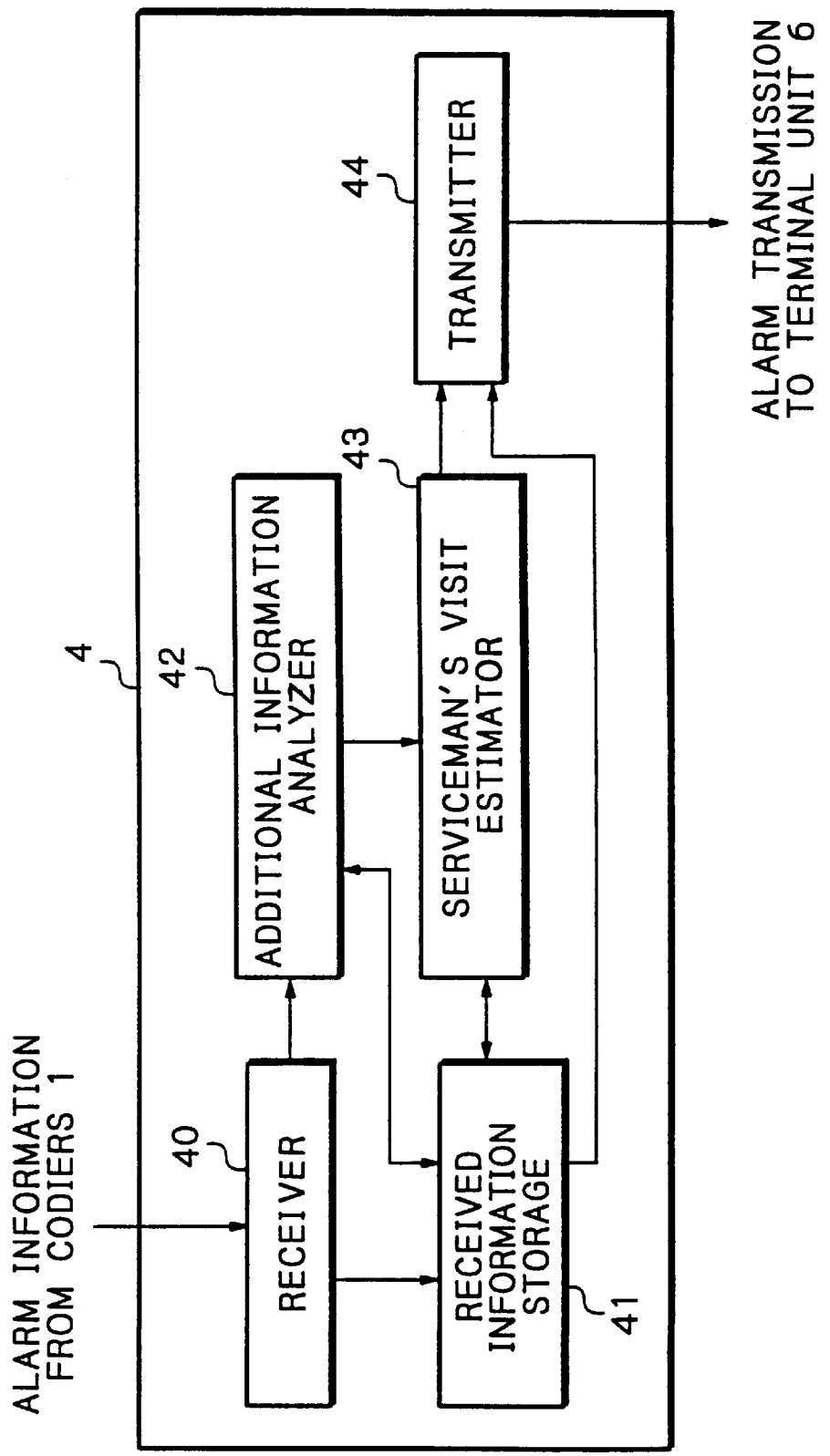
FIG. 10 is a block diagram schematically showing a specific configuration of each central control unit shown in FIG. 1.

FIG. 10 shows a specific configuration of each central control unit 4. As shown, the central control unit 4 includes a receiver 40 (clients 71*a*, 71*b* and so forth) for receiving from the copiers 1 jam alarm information and other alarm information, information relating to the operation and including positions of jams, TC values, image control voltages, serviceman (SC), sensor errors and other abnormal or preabnormal phenomena, and copier IDs (types and numbers). The information received from the copiers 1 are written to a received information storage 41 time-serially only over a preselected period of time. This received information storage 41 may be implemented by the HDD 99 of the server 72 shown in FIG. 9. The central control unit 4 additionally includes an additional information analyzer 42, a serviceman's visit estimator 43, and a transmitter 44.

Every time the receiver 40 receives alarm information from any one of the copiers 1, or at any other suitable timing, the additional information analyzer 42 analyzes the information relating to the operation of the above copier 1 (additional alarm information) and thereby performs remote diagnosis for the estimation of the occurrence of a trouble. If desired, the analyzer 42 may immediately determine that frequent paper jams are apt to occur at the position represented by the information in the near future.

Also, the additional information analyzer 42 determines that a trouble has occurred when it receives serviceman call information, sensor error information or similar abnormality information. Further, on receiving a TC value also, the analyzer 42 may memorize a difference between it and the previous TC value and use the difference for trouble diagnosis or for determining a time for maintenance.

The serviceman's visit estimator 43 determines whether or not to send a serviceman on the basis of the result of estimation or diagnosis of the additional information analyzer 42. If a serviceman's visit is necessary, the serviceman's visit estimator 43 delivers serviceman request information and, among the information stored in the received information storage 41, information necessary for a service to the transmitter 4. The transmitter 4 sends such information to one terminal unit 6 located at the service station covering the copier which needs a serviceman.

Figure 11:
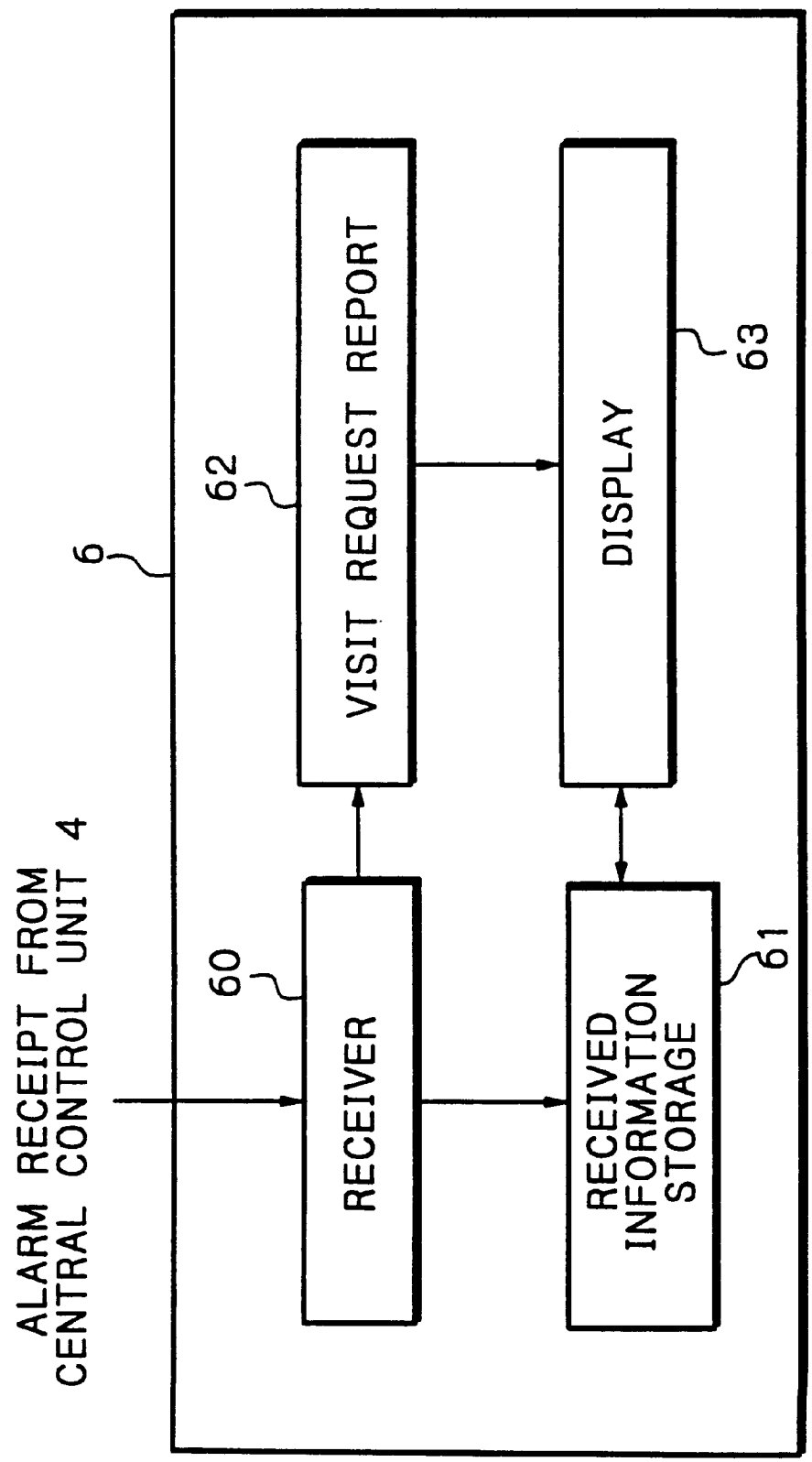
FIG. 11 is a block diagram schematically showing a specific configuration of each terminal unit shown in FIG. 1.

FIG. 11 shows a specific configuration of each terminal unit 6. As shown, the terminal unit 6 includes a receiver 60 for receiving the above information from the associated central control unit 4. The received information is written to a received information storage 61. A visit request report 62 reports the visit request received by the receiver 60. A display 63 displays the received information.

Figure 12B:
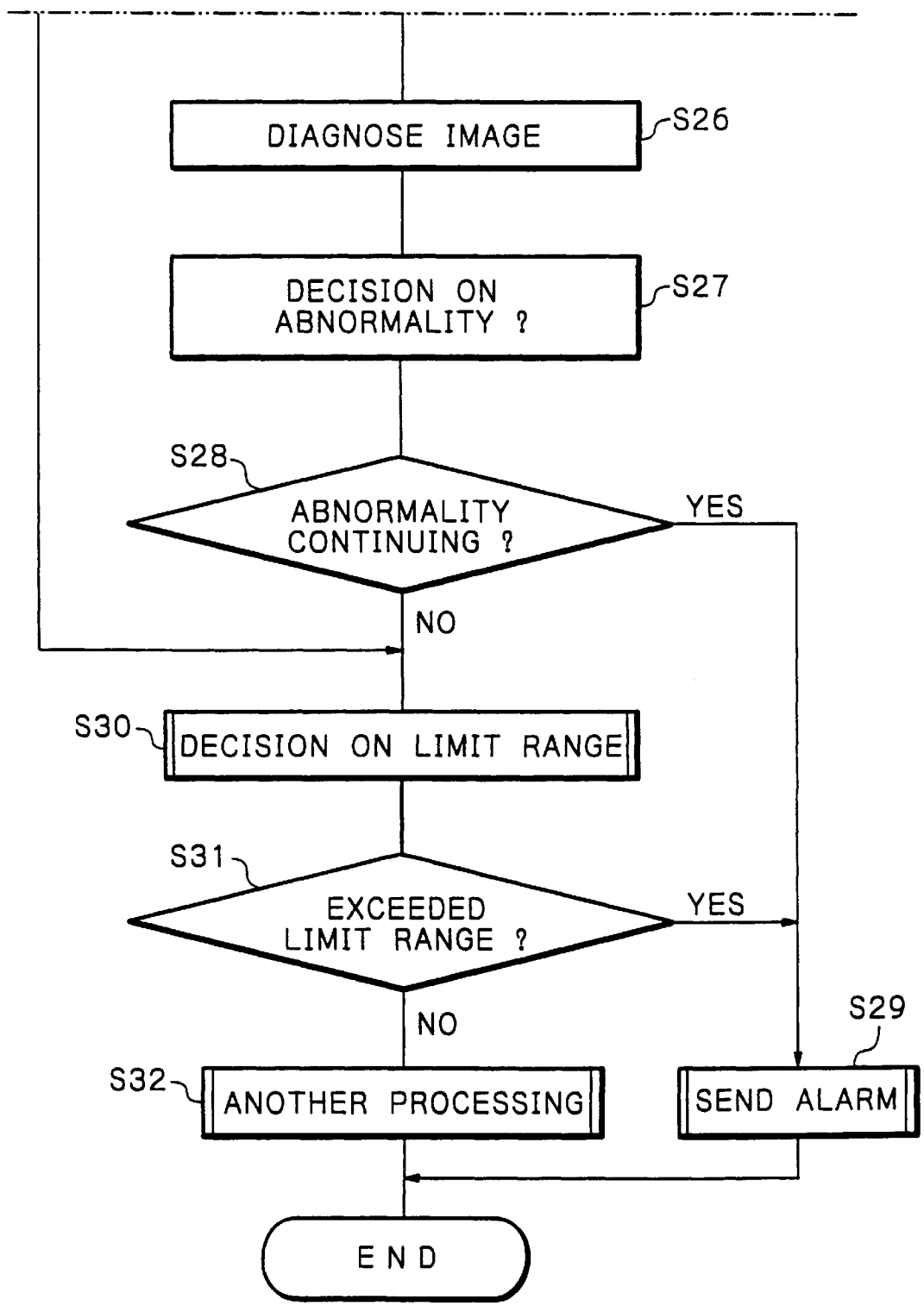
FIG. 12 is a flowchart demonstrating a specific alarm receipt procedure particular to the central control unit.
Figure 13A:
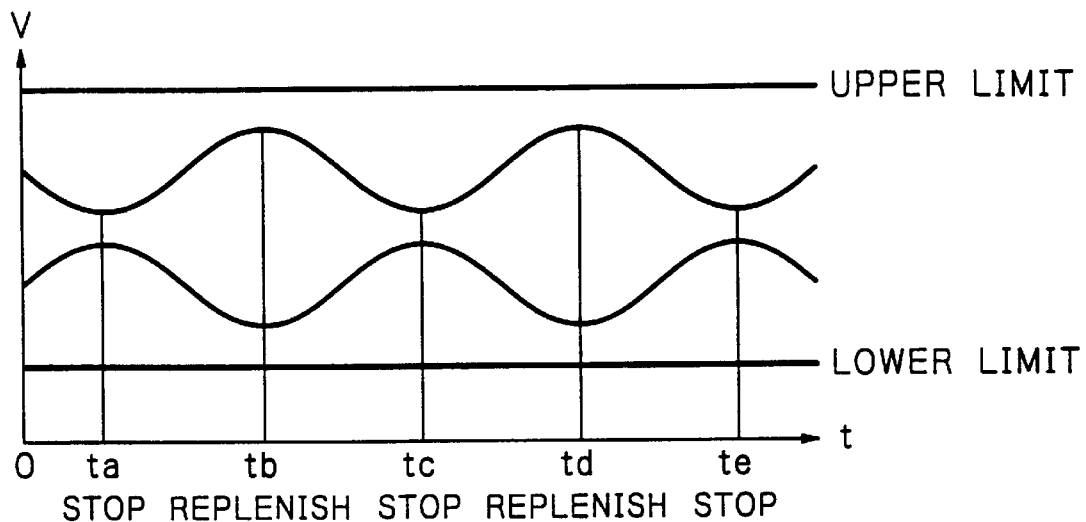
FIGS. 13A and 13B are charts showing the alarm receipt procedure more specifically.
Figure 13B:
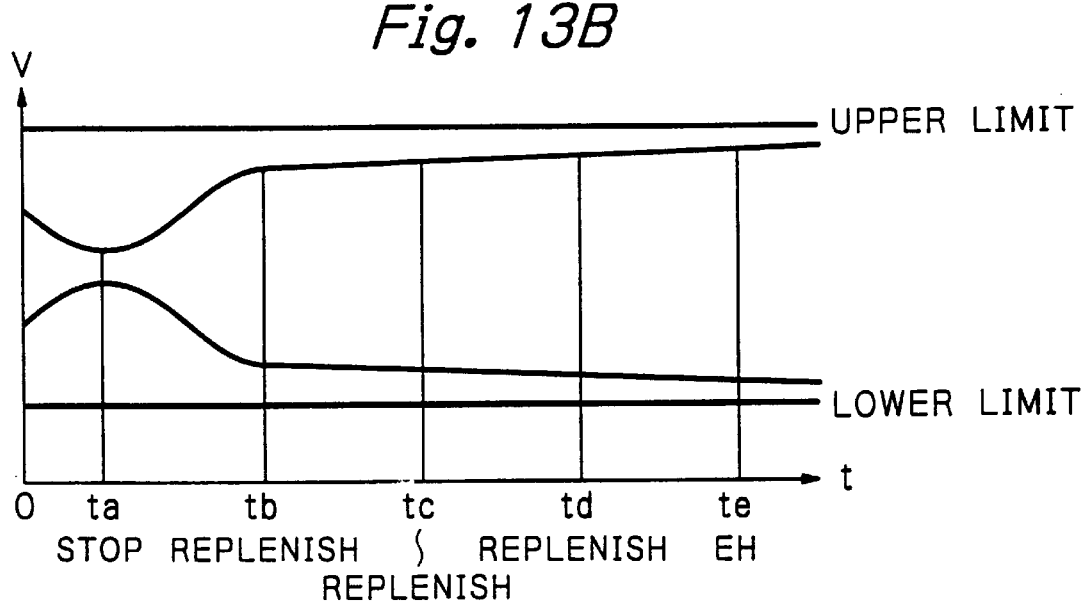

Reference will be made to FIGS. 12, 13A and 13B for describing a specific alarm receipt procedure, i.e., the analysis of image control voltages and the estimation of the occurrence of troubles or the need for a serviceman to be executed by each central control unit 4. FIG. 12 shows a main routine included in the procedure. As shown, when the receiver 40 receives alarm information including a copier ID and an image control voltage (Y, step S21), the received information is cumulatively stored in the received information storage 41 on the basis of the copier ID (step S22). Then, the additional information analyzer 42 determines whether or not a valid evaluation time has expired (step S23). If the valid evaluation time has expired (Y, step S24), the additional information analyzer 42 reads, among the information stored in the received information storage 41, toner content control voltages or similar image control voltages over the corresponding preselected period of time (variation history data) (step S25). The additional information analyzer 42 analyzes the variation of the image control voltage for diagnosing an image (step S26) and determines, based on the result of diagnosis, whether or not the image forming section is continuously abnormal (first estimation of the need for a serviceman's visit) (step S27).

For example, as shown in FIG. 13A, so far as the toner content control is normal, a toner content control voltage V varies in a preselected pattern at each of times ta, tb, tc, td and te where abnormal or preabnormal phenomena have occurred. However, as shown in FIG. 13B, when the toner content control is erroneous, the voltage V varies in an unusual pattern different from the preselected pattern. The additional information analyzer 42 determines that the image forming section is abnormal at the time tc when the pattern of FIG. 13B begins to differ from the pattern of FIG. 13A. Subsequently, the additional information analyzer 42 determines that the abnormality is continuing at the time td when the pattern of FIG. 13B is still different form the pattern of FIG. 13A. FIG. 13B shows a specific case that the above abnormality does not disappear up to the time te and renders background contamination so conspicuous, emergency maintenance (EM) by a serviceman is required.

Referring again to FIG. 12, if the abnormality of the image forming section is continuing and needs a serviceman visit (Y, step S28), the additional information analyzer 42 determines that a trouble has already occurred or is likely to occur in the image forming section. As a result, an alarm representative of a serviceman request and associated necessary information are sent from the transmitter 44 to the terminal unit 6 covering the copier 1 in question (step S29).

If the answer of the step S28 is N, the additional information analyzer 42 determines whether or not the image control voltage received this time is above an upper limit or below a lower limit (second estimation of the need for a serviceman's visit) (step S30). If the answer of step S30 is Y, meaning that a trouble has occurred or is apt to occur in the image forming section, an alarm is sent from the transmitter 44 to the terminal unit covering the copier 1 in question (step S29). If the answer of step S31 is N, processing for receiving alarms from the sections other than the image forming section is executed (step S32). This is the end of the specific procedure.

In the above procedure, the central control unit 4 makes decision on a serviceman request on the basis of two consecutive image control voltages received within a preselected period of time. If desired, the two consecutive image control voltages may be replaced with a single or three or more image control voltages appearing in the preselected period of time. The preselected period of time may be determined in terms of a total counter value unique to the copier 1.

Further, in the specific procedure, an alarm is sent when the image forming section of the copier 1 is continuously abnormal. Alternatively, a serviceman's visit may be determined to be necessary when the image control voltage tends to increase or decrease or become constant at a certain time.

In the above procedure, each central control unit 4 performs image diagnosis. Alternatively, each copier 1 may store, every time an abnormal or a preabnormal phenomenon occurs (or at any other suitable timing), such phenomena time-serially in a memory built in the copier 1. This allows the copier 1 to perform image diagnosis on the basis of the variation of the image control voltage during idle time (stand-by state).

Each central control unit 4 may detect a normal condition of the image forming section of the copier 1 in place of the abnormal condition, if desired.

In the above specific procedure, each central control unit 4 analyzes image control voltages time-serially stored therein every time it receives alarm information from the copier 1. Alternatively, to enhance accurate diagnosis, the central control unit 4 may analyze the stored voltages at any preselected time or at preselected intervals.

The jam alarm receipt processing of the central control unit 4 is disclosed in, e.g., Japanese Patent Laid-Open Publication No. 8-195849. Also, the jam alarm processing of the copier 1 and the jam alarm receipt processing of the central control unit 4 may be effected as taught in, e.g., Japanese Patent Laid-Open Publication No. 9-321931.

Figure 14:
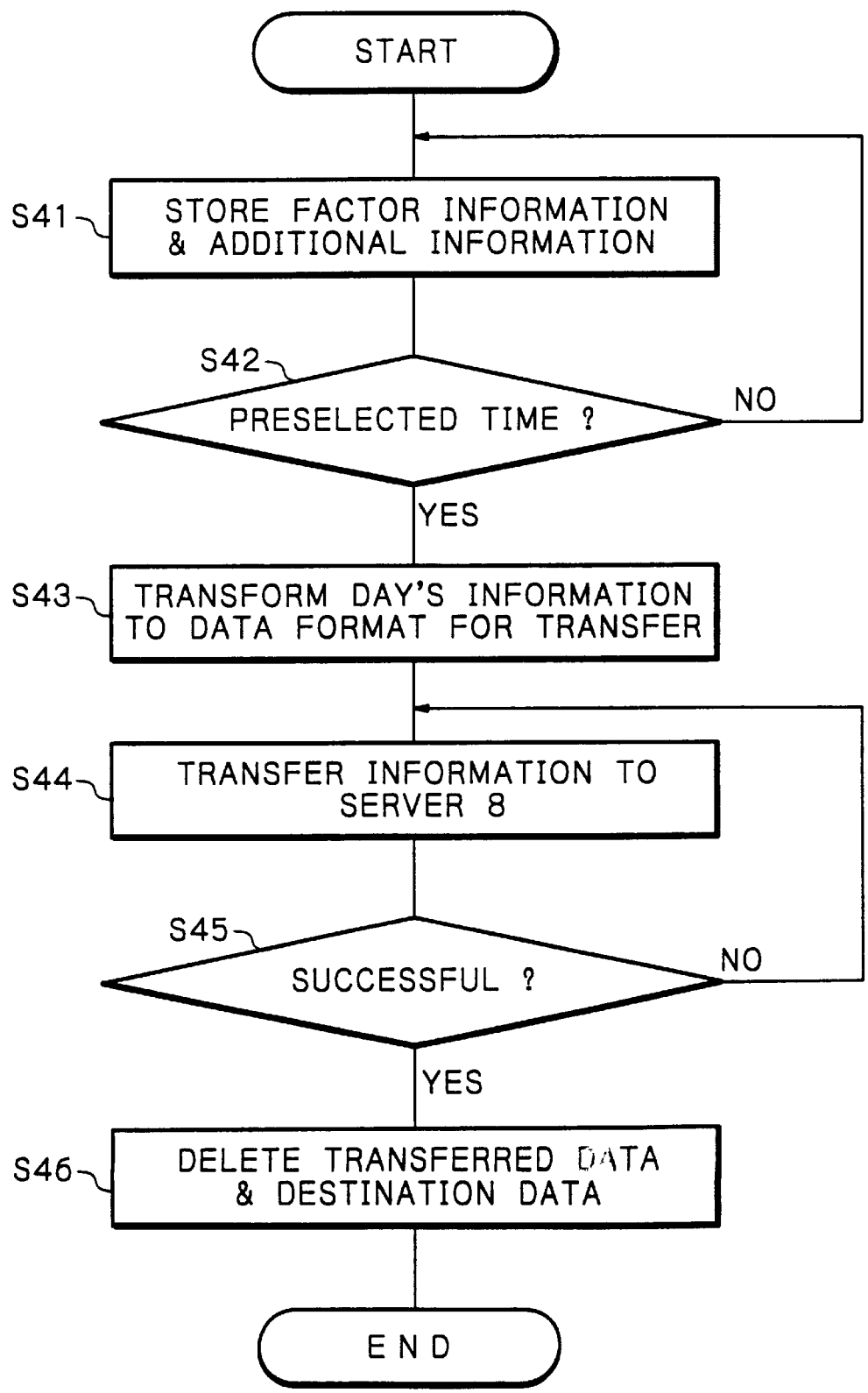
FIG. 14 is a flowchart representative of a specific information collection and storage procedure particular to the central control unit.
Figure 15:
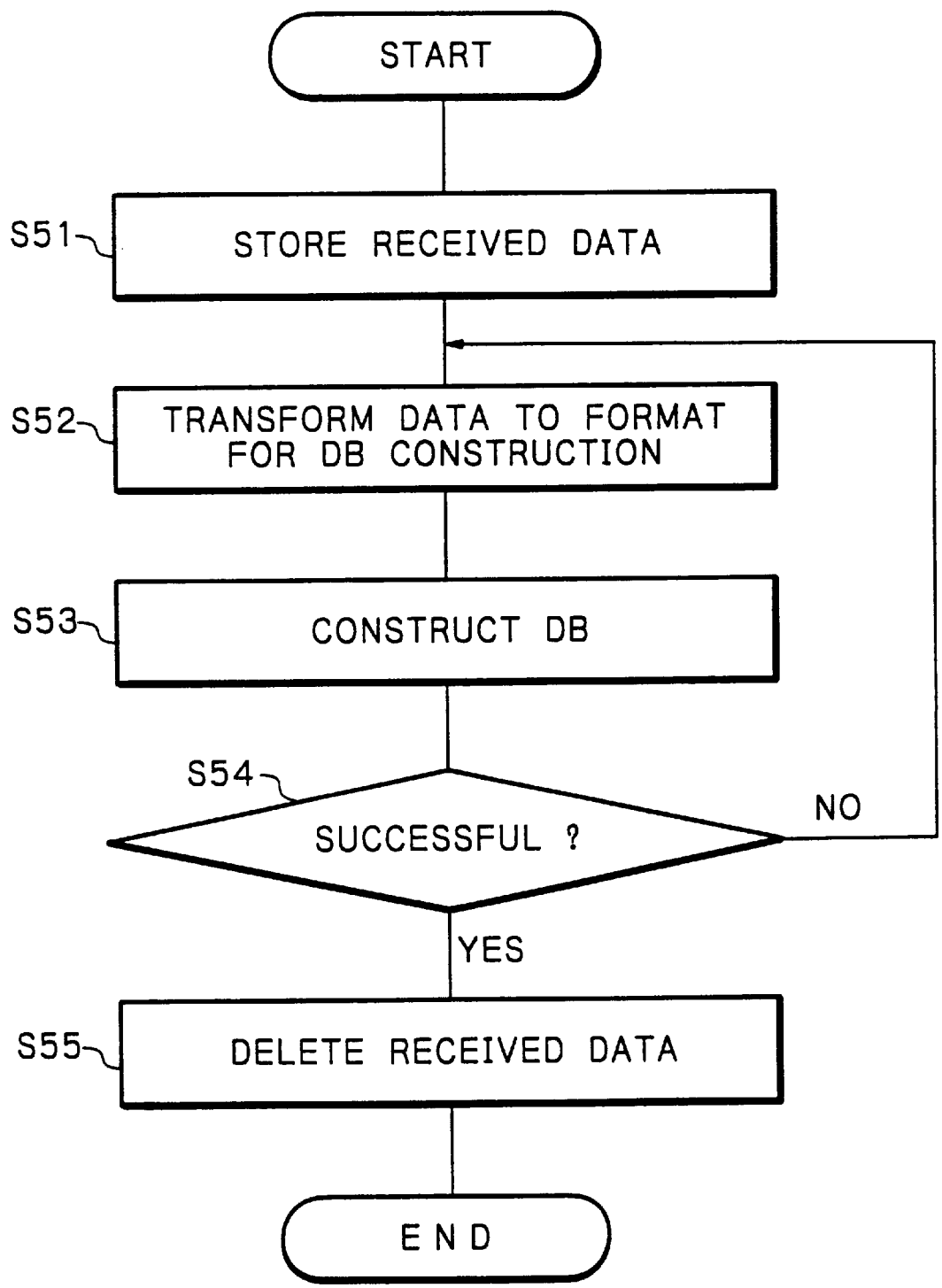
FIG. 15 is a flowchart showing a specific information collection and storage procedure particular to a server shown in FIG. 1.

Referring to FIGS. 14 and 15, the functions of the server 72 (see FIG. 9) of each central control unit 4, server 8 and each data processing unit 9 will be described.

FIG. 14 shows a specific procedure to be executed by each central control unit 4 for collecting and storing information. As shown, every time the clients 71a, 71b and so forth each receive alarm information, SC information, MC information or similar information from any one of the copiers 1 together with additional information, it transfers the received information to the server 72 via the LAN 73. The server 72 collects such information and stores them in a preselected data base (first data base) of the HDD 99 on a type and copier number basis (step S41).

At a preselected time suitable for communication, e.g., 0.00 a.m. when the traffic of the WAN 7 is not heavy (Y, step S42), the server 72 transforms the day's (one day) information stored in the first data base to a preselected data format (step S43) and then sends them to the server 8 via the WAN 7 (step S44). When the transfer successfully completes (S45), the server 72 deletes its data and destination data (step S46).

The first data base is assumed to exist independently of the received information storage 41 shown in FIG. 10.

FIG. 15 shows a specific procedure to be executed by the server 8 for collecting and storing information. As shown, the server 8 writes the information or data received from the server 72 of the central control unit 4 in an HDD or similar preselected memory (step S51). Subsequently, the server 8 transforms the stored information to a format suitable for constructing a DB (Data Base) (step S52), and then collects and stores the converted information in a preselected data base of the HDD (second data base) on a type and copier number basis, thereby constructing a data base (S53). When the above processing successfully completes (Y, step S54), the server 8 deletes the data stored in the above memory (step S55).

The operator of each data processing unit 9, i.e., a person using the data processing unit 9 is capable of downloading necessary information from the server 72 or 8 via the LAN 73 or the WAN 7 by manipulating a keyboard or a mouse. It is therefore possible for the operator to edit or analyze the obtained information with a graph and report preparing tool. It is also possible to mark a desired range of the information to download by operating the keyboard or the mouse.

By the above operation, the operator can easily prepare a graph or a report showing the information relating to the operation. The information may include numbers of copies classified by paper size (A3, A4, B4, B5, A5, etc.), numbers of copies classified by tray (first, tray, second tray, third tray, etc.), numbers of copies classified by copy mode (ADF (Automatic Document Feeder) mode, simplex copy mode, duplex copy mode, etc.), numbers of copies classified by magnification change mode (enlarge mode, equisize mode, reduction mode, etc.), numbers of copies classified by staple mode (front staple, rear staple, center staple, etc.), and position-by-position jam frequencies.

Further, information relating to the copiers 1 distributed over the whole country may be managed in a centralized manner and totaled area by area, type by type, or factor by factor. This allows persons at the service stations, e.g., the sales department, service department, design department and planning department to freely access the totaled information and analyze them in a total hierarchical fashion.

As stated above, the operator of each data processing unit 9 is capable of obtaining desired information from the server 72 or 8 via the LAN 73 or the WAN 7 by operating a keyboard or a mouse and edit and analyze them with a suitable tool. This noticeably reduces a period of time necessary for the operator to collect, edit and analyze the information and thereby enhances efficient work. It is therefore possible to support users efficiently by presenting carefully through out graphs and reports.

While the present invention has been shown and described in relation to a copier service system, it is, of course, similarly applicable to a service system for any other image forming apparatuses, e.g., printers, facsimile apparatuses or simple printers.

In summary, it will be seen that the present invention provides an image forming apparatus service system having various unprecedented advantages, as enumerated below.

(1) A person operating a data processing unit is capable of downloading, with a keyboard or a mouse, desired information relating to image forming apparatuses from information collecting and storing means included in a central control unit or from an information collecting and storing unit via a communication network and edit the obtained information. The person can therefore support users efficiently by presenting carefully through out graphs or reports.

(2) Each image forming apparatus stores reference information for determining a time for replacement part by part beforehand. When information relating to the use of any one of replaceable parts, as counted from the time of the last replacement, coincides with corresponding reference information, the apparatus outputs information representative of the above part and information demanding maintenance. Consequently, it is not necessary for a serviceman to replace or manage various replaceable parts by comparing the total number of copies and part-by-part numbers of copies and reference numbers set by the manufacturer beforehand. This eases the serviceman's work for managing the various replaceable parts of the image forming apparatus.

(3) When a trouble of the kind which the apparatus cannot automatically detect occurs therein, an IC card is mounted to the apparatus in order to send information representative of the trouble to a central control unit immediately. The user is therefore free from troublesome operation of keys of an operation and display panel. In addition, maintenance based on the report using the ID card enhances the quality of the apparatus.

(4) Each central control unit collects and stores, among information received from image forming apparatuses, image control voltages apparatus by apparatus, analyzes the stored information at a preselected timing for image diagnosis, and estimates a trouble to occur in the image forming section of any one of the apparatuses and the need for a serviceman's visit. The results of estimation are sent from the central control unit to a terminal unit located at a service station covering the apparatus in question. A serviceman can therefore take an adequate measure rapidly before a critical trouble occurs in the image forming section.

Various modifications will become possible for those skilled in the art after receiving the teachings of the present disclosure without departing from the scope thereof.

What is claimed is:

1. A service system for managing a plurality of image forming apparatuses each being capable of outputting, when a factor to be reported occurs, information representative of said factor, said service system comprising:

a plurality of terminal units each being situated at a particular service station;

a plurality of central control units configured to manage said image forming apparatuses by remote control, each central control unit covering a respective area and being connected to the image forming apparatuses lying in said area and one of said plurality of terminal units, said plurality of central control units each comprising information collecting and storing means for collecting and storing information received from said image forming apparatuses apparatus by apparatus, said plurality of central control units each analyzing said information and selectively sending necessary information to the terminal unit connected thereto;

an information collecting and storing unit connected to said plurality of central control units by a communication network and configured to collect the information stored in said information collecting and storing means of each of said plurality of central control units via said communication network and storing said information; and a data processing unit configured to download desired information from said information collecting and storing means of said plurality of central control units or from said information collecting and storing unit and editing said information.

2. A service system as claimed in claim 1, wherein said data processing unit comprises marking means for marking a range of information to be downloaded.

3. A service system as claimed in claim 1, wherein the factor to be reported includes an abnormal phenomenon or a preabnormal phenomenon.

4. A service system as claimed in claim 1, wherein the desired information includes information relating to maintenance and repair.

5. A service system as claimed in claim 1, wherein the image forming apparatuses and said plurality of terminal units are connected to said plurality of central control units by a communication unit.

6. A service system as claimed in claim 1, wherein the image forming apparatuses each include adding means for adding information relating to an operation and including a cumulative number of images produced to information representative of the factor to be reported.

7. A service system for managing a plurality of image forming apparatuses each being capable of outputting, when a factor to be reported occurs, information representative of said factor, said service system comprising:

a plurality of terminal units each being situated at a particular service station; and a central control unit connected to the plurality of image forming apparatuses and said plurality of terminal units, and configured to manage said plurality of image forming apparatuses by remote control;

the image forming apparatuses each comprising:

reference information setting means for setting reference information for determining a time for replacement for each of various replaceable parts, said reference information including at least one of a reference number of papers used, a reference operation time, and a reference change in condition;

deciding means for determining with each replaceable part whether or not use information including at least one of a number of papers used, an operation time, and a change in condition is coincident with a corresponding one of said reference information; and information outputting means for outputting, when said deciding means determines that said use information is coincident with said reference information, desired information including information representative of a corresponding replaceable part and information for demanding maintenance.

8. A service system as claimed in claim 7, wherein the factor to be reported includes an abnormal phenomenon or a preabnormal phenomenon.

9. A service system as claimed in claim 7, wherein the desired information includes information relating to maintenance and repair.

10. A service system as claimed in claim 7, wherein the image forming apparatuses and said plurality of terminal units are connected to said central control unit by a communication unit.

11. A service system as claimed in claim 7, wherein said information outputting means comprises means for displaying or printing said information representative of the replaceable part and said information for demanding maintenance.

12. A service system as claimed in claim 7, wherein said information outputting means comprises means for sending said information representative of the replaceable part and said information for demanding maintenance to said central control unit.

13. A service system as claimed in claim 7, wherein said reference information setting means comprises means for grouping said reference information by kind when said reference information are set.

14. A service system as claimed in claim 7, wherein said reference information setting means comprises means for setting said reference information by taking account of user characteristics.

15. A service system as claimed in claim 14, wherein the user characteristics include a user's emotion factor as to noise ascribable to a trouble and an environmental factor including at least one of temperature and humidity.

16. A service system as claimed in claim 7, wherein the image forming apparatuses each further comprises canceling means for canceling said reference information set by said reference information setting means.

17. A service system for managing a plurality of image forming apparatuses each being capable of outputting, when a factor to be reported occurs, information representative of said factor, said service system comprising:
 a plurality of terminal units each being situated at a particular service station; and
 a central control unit connected to the plurality of image forming apparatuses and said plurality of terminal units and configured to manage said plurality of image forming apparatuses by remote control;
 the image forming apparatuses each comprising:
  reading means for reading information stored in an ID card or similar input medium when said input medium is mounted to the image forming apparatus;
  recognizing means for recognizing a content of the information stored in the input medium;
  deciding means for determining, based on the content recognized by said recognizing means, whether or not a report command is present; and
  reporting means for reporting, when the report command is present, desired information designated by said report command to said central control unit.

18. A service system as claimed in claim 17, wherein the factor to be reported includes an abnormal phenomenon or a preabnormal phenomenon.

19. A service system as claimed in claim 17, wherein the desired information includes information relating to maintenance and repair.

20. A service system as claimed in claim 17, wherein said image forming apparatuses and said plurality of terminal units are connected to said central control unit by a communication unit.

21. A service system as claimed in claim 17, wherein the image forming apparatuses each further comprise:
 identifying means for identifying, when the report command is present, a kind of a report on the basis of the content recognized by said recognizing means; and
 commanding means for causing said reporting means to send a report of the kind identified by said identifying means.

22. A service system as claimed in claim 17, wherein the image forming apparatuses each further comprises:
 displaying means for displaying kinds of reports when the report command is present;
 selecting means for allowing one of the kinds of reports appearing on said displaying means to be selected; and
 commanding means for causing said reporting means to send a report of the kind selected by said selecting means.

23. A service system for managing a plurality of image forming apparatuses each being capable of outputting, when a factor to be reported occurs, information representative of said factor, said service system comprising:
 a plurality of terminal units each being situated at a particular service station; and
 a central control unit connected to the plurality of image forming apparatuses and said plurality of terminal units, and configured to manage said plurality of image forming apparatuses by remote control;
 the plurality of image forming apparatuses each comprising adding means for adding a current image control voltage to the information representative of the factor to be reported;
 said central control unit comprising:
  voltage information collecting and storing means for collecting and storing, among the information received from the plurality of image forming apparatuses, image control voltages apparatus by apparatus;
  diagnosing means for analyzing at a preselected timing the information stored in said voltage information collecting and storing means to thereby diagnose an image forming apparatus;
  estimating means for estimating, based on a result of diagnosis output from said diagnosing means, a trouble in an image forming apparatus and a need for a serviceman's visit; and
  transmitting means for sending desired information including a result of estimation output from said estimating means to one of said plurality of terminal units located at a service station covering the image forming apparatus subjected to the diagnosis.

24. A service system as claimed in claim 23, wherein the factor to be reported includes an abnormal phenomenon or a preabnormal phenomenon.

25. A service system as claimed in claim 23, wherein the desired information includes information relating to maintenance and repair.

26. A service system as claimed in claim 23, wherein the image forming apparatuses and said plurality of terminal units are connected to said central control unit by a communication unit.

27. A method for managing a plurality of image forming apparatuses connected to one of a plurality of central control units each of which is located at a service center covering a particular service area and is further connected to a plurality of terminal units each situated at a particular service station associated with at least one of said image forming apparatuses, said method comprising:
 sending from each one of said image forming apparatuses to a respective central control unit first information representative of a preselected factor occurring in the image forming apparatus and second information relating to the operation of the image forming apparatus;
 receiving and storing said first and second information in said central control unit;
 analyzing said first and second information in the central control unit to determine whether a serviceman visit is necessary for any of said plurality of image forming apparatuses;
 when said analyzing step determines that a serviceman visit is necessary for a particular image forming apparatus, sending a repair request from the central control unit to a terminal unit associated with said particular image forming apparatus along with information, from said stored first and second information, that is necessary for servicing the particular image forming apparatus.

28. The method of claim 27, wherein said first information comprises information relating to a number of errors occurring at a particular position of the image forming apparatus and attributable to a common cause.

29. The method as claimed in claim 28, wherein said information relating to a number of errors occurring at a particular position of the image forming apparatus and attributable to a common cause comprises paper jam alarm information including a count of a number of paper jams detected at said position as a function of a number of copies produced by the image forming apparatus; and said second information comprises at least one of a cause of a paper jam, a paper size, a total count of a number of copies performed by the image forming apparatus, an operation time of a pick up roller of the image forming apparatus, a fixing temperature of the image forming apparatus, and an image control voltage of the image forming apparatus.

30. A system for managing a plurality of image forming apparatuses connected to one of a plurality of central control units each of which is located at a service center covering a particular service area and is further connected to a plurality of terminal units each situated at a particular service station associated with at least one of said image forming apparatuses, said system comprising:

means for sending from each one of said image forming apparatuses to a respective central control unit first information representative of a preselected factor occurring in the image forming apparatus and second information relating to the operation of the image forming apparatus;

means for receiving, storing, and analyzing said first and second information in the central control unit to determine whether a serviceman visit is necessary for any of said plurality of image forming apparatuses;

means for sending a serviceman visit request for a particular image forming apparatus along with information, from said stored first and second information, that is necessary for servicing the particular image forming apparatus to a terminal unit associated with the particular image forming apparatus when said means for receiving, storing, and analyzing determines that said particular image forming apparatus requires a serviceman visit.

31. The system of claim 30, wherein said first information comprises information relating to a number of errors occurring at a particular position of the image forming apparatus and attributable to a common cause.

32. The system as claimed in claim 31, wherein said information relating to a number of errors occurring at a particular position of the image forming apparatus and attributable to a common cause comprises paper jam alarm information including a count of a number of paper jams detected at said position as a function of a number of copies produced by the image forming apparatus; and said second information comprises at least one of a cause of a paper jam, a paper size, a total count of a number of copies performed by the image forming apparatus, an operation time of a pick up roller of the image forming apparatus, a fixing temperature of the image forming apparatus, and an image control voltage of the image forming apparatus.

* * * * *